(12) United States Patent
Sasaki et al.

(10) Patent No.: US 7,703,805 B2
(45) Date of Patent: Apr. 27, 2010

(54) VEHICLE FRONT BODY STRUCTURE

(75) Inventors: Shin Sasaki, Hiroshima (JP); Minoru Inoue, Hiroshima (JP); Takahiro Aonuma, Hiroshima (JP); Hiroaki Fujii, Hiroshima (JP)

(73) Assignee: Mazda Motor Corporation (JP)

( * ) Notice: Subject to any disclaimer, the term of this patent is extended or adjusted under 35 U.S.C. 154(b) by 296 days.

(21) Appl. No.: 11/709,121

(22) Filed: Feb. 22, 2007

(65) Prior Publication Data

US 2007/0215402 A1  Sep. 20, 2007

(30) Foreign Application Priority Data

Mar. 15, 2006  (JP) .............................. 2006-070632
Mar. 15, 2006  (JP) .............................. 2006-070646
Mar. 15, 2006  (JP) .............................. 2006-070647

(51) Int. Cl.
B62D 21/09 (2006.01)

(52) U.S. Cl. ................... 280/784; 296/203.02; 296/194

(58) Field of Classification Search ................ 280/784, 280/785, 790, 791, 797, 798; 296/187.09, 296/203.02, 174, 35.2; 180/232
See application file for complete search history.

(56) References Cited

U.S. PATENT DOCUMENTS

| | | | | |
|---|---|---|---|---|
| 4,919,474 A * | 4/1990 | Adachi et al. | .......... | 296/203.02 |
| 5,031,958 A * | 7/1991 | Fujita et al. | ............ | 296/203.02 |
| 5,118,160 A * | 6/1992 | Kitagawa et al. | ........ | 296/187.03 |
| 5,244,248 A * | 9/1993 | Bovellan | ................ | 296/187.09 |
| 5,267,630 A * | 12/1993 | Watanabe et al. | ........... | 180/297 |
| 5,346,276 A * | 9/1994 | Enning et al. | .......... | 296/203.02 |
| 5,466,033 A * | 11/1995 | Murakami et al. | ..... | 296/203.02 |
| 6,068,330 A | 5/2000 | Kasuga et al. | | |
| 6,595,313 B2 * | 7/2003 | Cheong | ..................... | 180/312 |
| 7,147,275 B2 * | 12/2006 | Matsuyama et al. | .... | 296/203.02 |
| 7,210,733 B2 * | 5/2007 | Mouch et al. | .......... | 296/203.02 |
| 2005/0236827 A1 * | 10/2005 | Mouch et al. | ............... | 280/788 |
| 2007/0215402 A1 * | 9/2007 | Sasaki et al. | ................ | 180/232 |

FOREIGN PATENT DOCUMENTS

| | | |
|---|---|---|
| JP | 11180343 | 7/1999 |
| JP | 2005-335619 | 12/2005 |
| JP | 2005335619 A * | 12/2005 |
| WO | WO 9115391 | 10/1991 |

* cited by examiner

*Primary Examiner*—Ruth Ilan
*Assistant Examiner*—Karen Jane J Amores
(74) *Attorney, Agent, or Firm*—Studebaker & Brackett PC; Donald R. Studebaker

(57) ABSTRACT

A bridge-shaped frame member is disposed on a front side frame in front of a suspension tower so as to extend vertically and stride over a No. 4 mount. Accordingly, there can be provided a vehicle front body structure that can attain a proper energy absorption of the front side frame with its axial compression can be attained at a vehicle crash.

5 Claims, 23 Drawing Sheets

Vehicle Forward

Vehicle Outward

VEHICLE FRONT BODY STRUCTURE

BACKGROUND OF THE INVENTION

The present invention relates to a vehicle front body structure of an automotive vehicle, and in particular, relates to a vehicle front body structure that comprises a pair of right-and-left front side frames and suspension tower portions to accommodate a suspension device.

Developments of properly transmitting a crash load acting on a front side frame extending in a longitudinal direction to a vehicle rear portion have been conducted for a vehicle front body structure of an automotive vehicle in order to improve a safety against a vehicle crash.

In a conventional structure, the impact load is mainly transmitted to a body frame that is connected to a rear end of the front side frame and located at a vehicle lower portion. Herein, the impact load is not transmitted to a vehicle upper portion, so the front side frame may bend upward at its base portion near a dash panel. As a result, there is a concern that an energy absorption of the front side frame with its axial compression could not be properly attained.

Accordingly, a vehicle front body structure that is disclosed in Japanese Patent Laid-Open Publication No. 2005-335619, for example, has been proposed. According to this structure, there is provided a rigidity member that extends upward along a wheel apron so as to interconnect the front side frame and an apron member, so that the crash load acting on the front side frame can be transmitted to the apron member located at the vehicle upper portion.

Meanwhile, the front side frame generally has an engine mount thereon for supporting a power plant including an engine. In particular, in a case of a vehicle equipped with a laterally-disposed power plant (an engine output shaft is disposed in a vehicle width direction), the engine mount is generally located in front of the suspension tower portion.

Herein, in a case where the rigidity member disclosed in the above-described patent publication is provided, the engine mount may interfere with the rigidity member and therefore there would be necessity to change a shape of this rigidity member to avoid the interference with the engine mount. Thus, there is a concern the crash energy could not be properly transmitted to the vehicle upper portion.

SUMMARY OF THE INVENTION

An object of the present invention is to provide a vehicle front body structure that can attain a proper energy absorption of the front side frame with its axial compression at a vehicle crash.

According to the present invention, there is provided a vehicle front body structure, comprising a front side frame provided so as to project forward from a dash panel, an apron member provided so as to project forward at a location that is outside the front side frame, a suspension tower portion provided so as to protrude in an engine room for accommodating a front suspension therein, the suspension tower portion being disposed between the apron member and the front side frame, an engine mount provided at the front side frame in front of the suspension tower portion so as to support a side portion of a power plant, and a member provided so as to interconnect an upper portion of the suspension tower portion and a portion of the front side frame that is located in front of the engine mount, the member being disposed so as to extend substantially straightly in such a manner that the member overlaps with the engine mount in a plan view.

According to the present invention with the above-described structure, since the front side frame can be prevented from improperly bending upward by properly transmitting the impact load to the vehicle upper portion, allowing the engine mount to be disposed on the front side frame, a proper energy absorption of the front side frame with its axial compression at the vehicle crush can be attained.

According to an embodiment of the present invention, the above-described member is a bridge-shaped member, a rear portion of which is connected to the upper portion of the suspension tower portion and a front portion of which is connected to the above-described portion of the front side frame that is located in front of the engine mount, the bridge-shaped member being disposed to stride over the engine mount. Thereby, since the bridge-shaped member interconnecting the front side frame and the upper portion of the suspension tower portion is disposed so as to extend over the engine mount in such a manner that the member overlaps with the engine mount in the plan view, the member for transmitting the impact load can be disposed so as to extend substantially straightly between the front side frame and the suspension tower portion without interference with the engine mount. Thus, without necessity to change a support point of the power plant (disposition location of the engine mount), the impact energy acting on the front side frame can be properly transmitted to the upper portion of the suspension tower portion. Further, since the front portion of the member is connected to the portion of the front side frame in front of the engine mount and thereby the impact load is derived from this front-located support position of the power plant by the member, there may be no need to reduce the rigidity of a rear part of the front side frame behind this power plant support position in order to ensure a proper impact absorption function. Accordingly, the frame rigidity at the power plant support position can be increased so as to ensure the proper support rigidity of the power plant.

According to another embodiment of the present invention, the above-described member comprises a first base portion that is connected to the portion of the front side frame that is located in front of the engine mount and a second base portion that is connected to a portion of the front side frame that is located in back of the engine mount. Thereby, in case of a relatively light crash, the impact energy derived from the first base portion of the member is transmitted to the upper portion of the suspension tower portion, while in case of a relatively heavy crash, the rearward-moving energy of the power plant derived from the second base portion of the member is also transmitted to the upper portion of the suspension tower portion. Accordingly, the amount of energy to be transmitted to the upper portion of the suspension tower portion can be changed according to the impact degree, and the impact transmission by the above-described member can be properly attained.

According to another embodiment of the present invention, the engine mount is attached to part of the above-described member, and the member transmits an energy of the power plant moving rearward generated at a vehicle frontal crash to the upper portion of the suspension tower portion. Thereby, by providing the above-described member, the rearward-moving energy of the power plant can be separately transmitted to the upper and lower portions of the vehicle body.

According to another embodiment of the present invention, the member comprises a frame member that is connected to a front face portion of the suspension tower portion so as to form a closed cross section with the front face portion of the suspension tower portion, the closed cross section extending substantially vertically. Thereby, the rigidity of the frame member can be increased with the closed cross section formed by using the rigid suspension tower portion for a suspension device. Thus, the above-described function of the member can be properly attained with this frame member.

According to another embodiment of the present invention, the member comprises the frame member that is connected to the front face portion of the suspension tower portion and an engine mount attaching portion that is connected to a front portion of the frame member so as to support the engine mount, and the frame member forms the closed cross section with the front face portion of the suspension tower portion, the closed cross section extending substantially vertically. Thereby, since the member comprises the engine mount attaching portion in addition to the frame member, the engine mount can be properly disposed without any improper interference with the frame member.

According to another embodiment of the present invention, there is provided a wheel apron that interconnects the above-described apron member and front side frame in front of the suspension tower portion, a lower end portion of the engine mount attaching portion is connected to the front side frame and an outside portion of the engine mount attaching portion is connected to the wheel apron, and the engine mount is fixed to an upper face portion of the engine mount attaching portion. Thereby, the rearward-moving energy of the power plant can be properly transmitted to the front side frame via the lower portion of the box-shaped engine mount attaching portion. Thus, the engine mount attaching portion can be prevented from being broken, so the transmission of the rearward-moving energy of the power plant to the front side frame can be surely attained.

According to another embodiment of the present invention, the engine mount attaching portion is formed in a box shape and has an opening at an upper face thereof, and the engine mount is inserted into the opening and fixed to the engine mount attaching portion so that a lower portion of the engine mount is stored in the box-shaped engine mount attaching portion. Thereby, since the rearward-moving energy of the power plant can be properly transmitted to the front side frame via the lower portion of the box-shaped engine mount attaching portion, the engine mount attaching portion can be prevented from being broken.

According to another embodiment of the present invention, a cowl portion is provided behind the suspension tower portion so as to extend in a vehicle width direction, and there is provided a connecting member that interconnects the upper portion of the suspension tower portion and the cowl portion and extends substantially in a longitudinal direction of a vehicle. Thereby, since the upper portion of the suspension tower portion and the cowl portion is interconnected by the connecting member, the rearward-moving energy transmitted to the upper portion of the suspension tower portion is directly transmitted to the cowl portion as well. Accordingly, the function of the vehicle body against the crush can be properly improved. Thus, the proper transmission of the impact to the vehicle upper portion by the member can be properly attained and thereby the energy absorption of the front side frame with the axial compression can be surely attained.

According to another embodiment of the present invention, the above-described member comprises a pair of members that are provided at left and rights sides of a vehicle respectively, the pair of members are disposed obliquely in such a manner that a distance between the members gradually becomes wider toward a rear of the vehicle in a plan view, and respective upper portions of left-and-right side suspension towers are interconnected by a suspension-tower bar. Thereby, since the members are disposed obliquely as described above, the load moving the upper of the suspension tower portions outward acts at the vehicle crash. This outward movement generates a plastic deformation at the suspension-tower bar in the vehicle width direction, i.e., its axial direction. Thus, the impact energy acting on the front side frames can be properly transmitted and absorbed by utilizing the existing suspension-tower bar that is provided to improve the maneuverability of the vehicle. Accordingly, the proper absorption of the impact energy can be attained without providing any additional reinforcing members at the vehicle upper body.

Other features, aspects, and advantages of the present invention will become apparent from the following description that refers to the accompanying drawings.

DETAILED DESCRIPTION OF THE INVENTION

Hereinafter, preferred embodiments will be described referring to the accompanying drawings.

Figure 1:
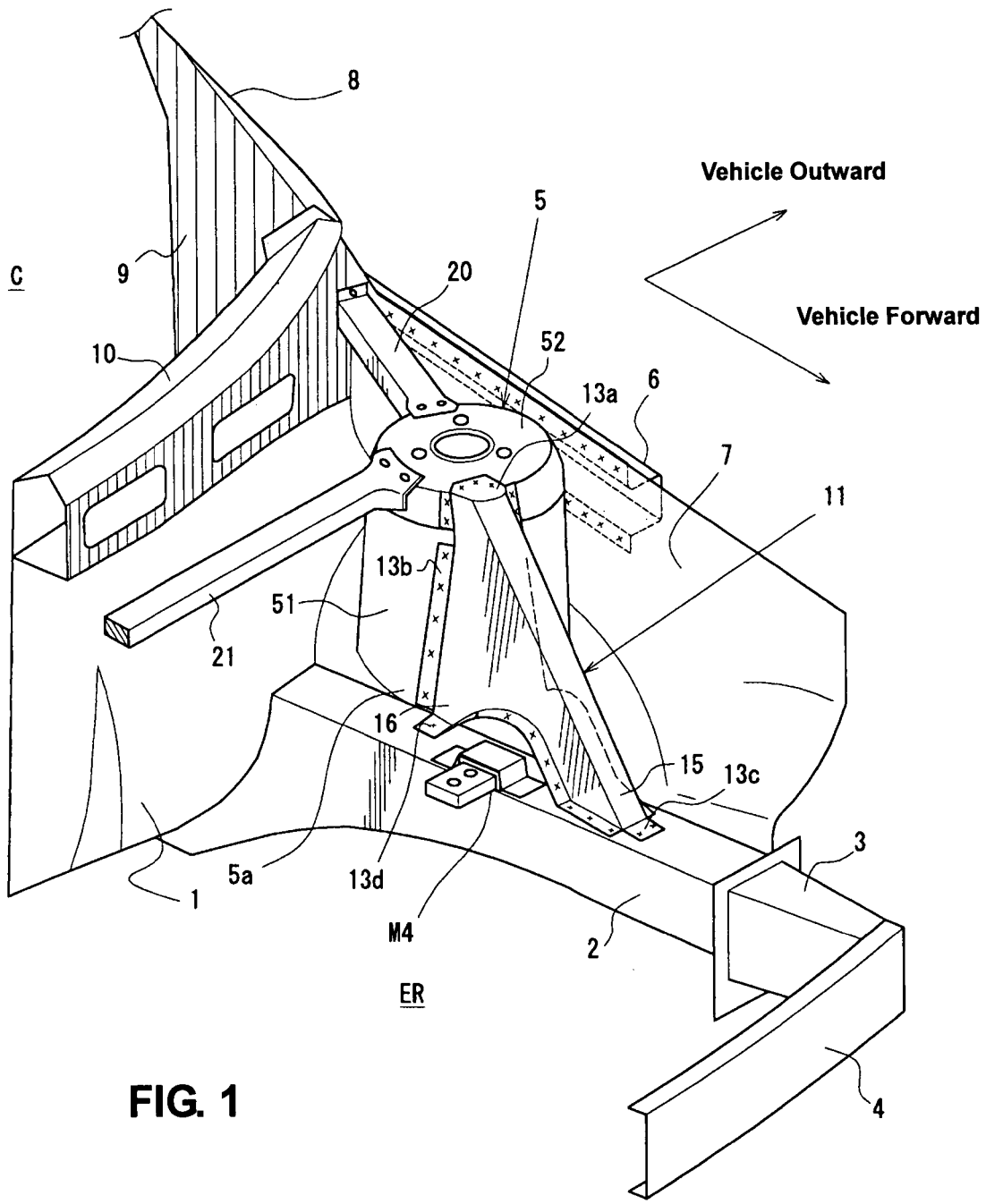
FIG. 1 is a right-side perspective view showing a left-side portion of a vehicle front body structure of a first embodiment of the present invention.
Figure 2:
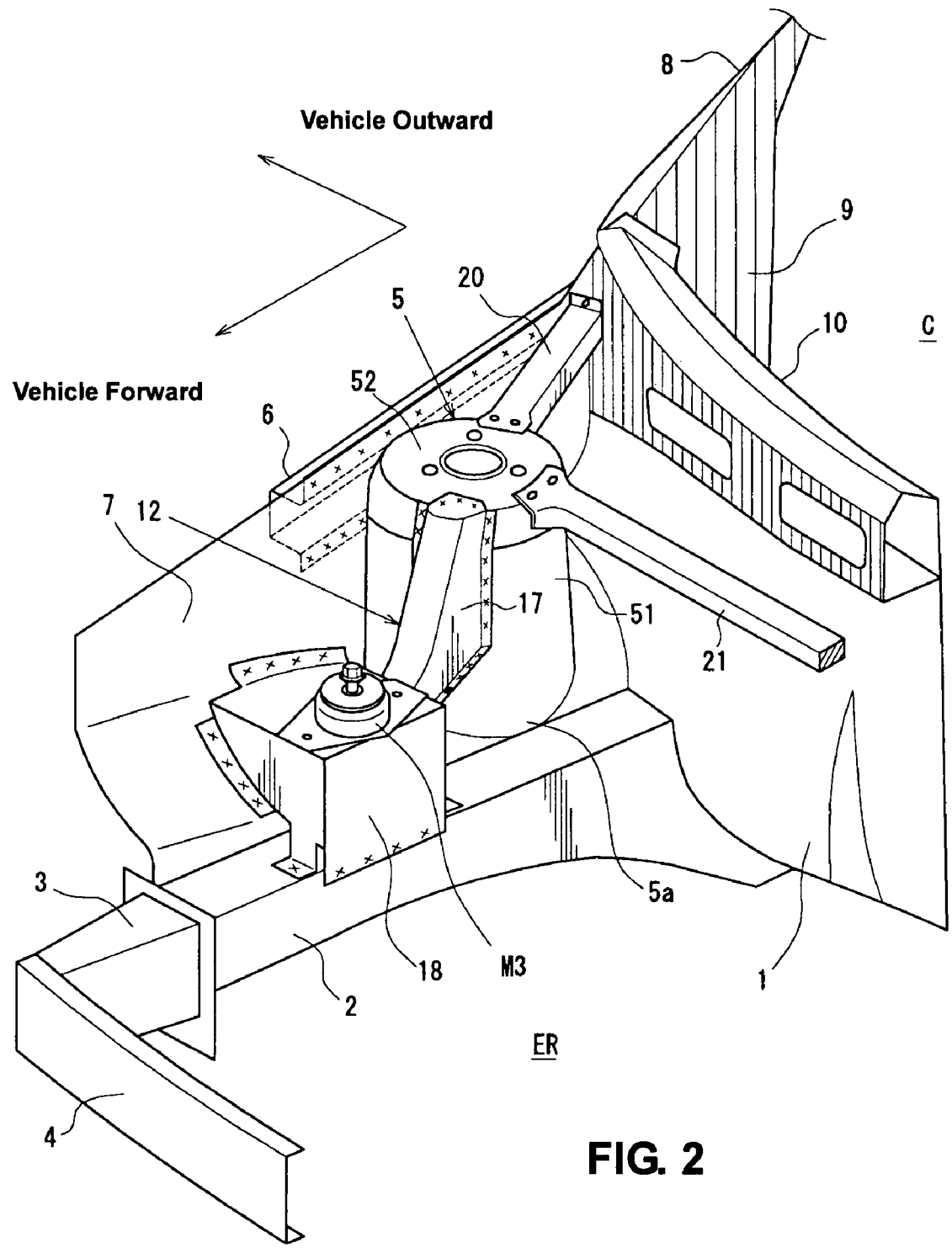
FIG. 2 is a left-side perspective view showing a right-side portion of the vehicle front body structure of the first embodiment of the present invention.
Figure 3:
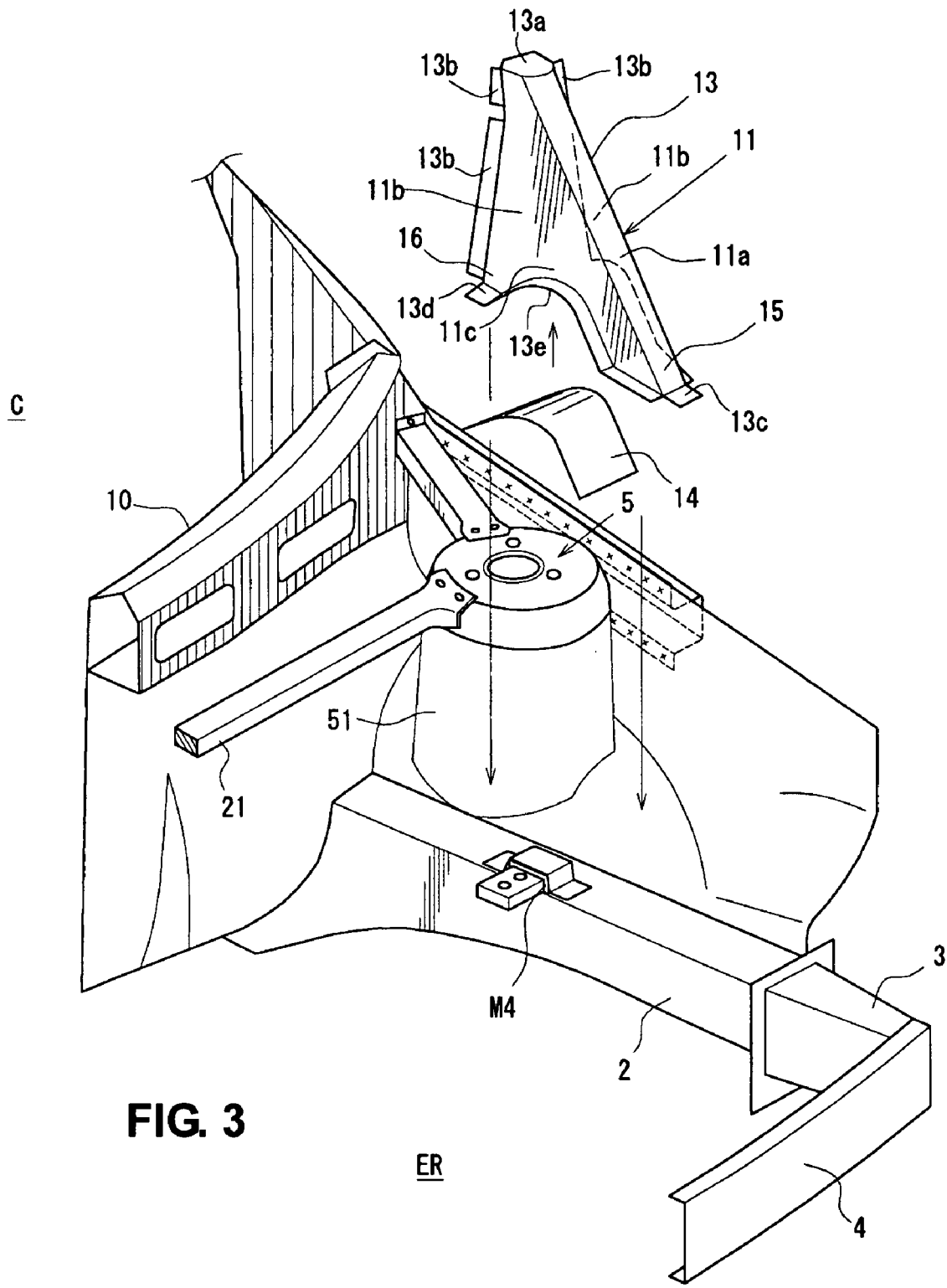
FIG. 3 is an exploded perspective view of the left-side portion of the vehicle front body structure.
Figure 4:
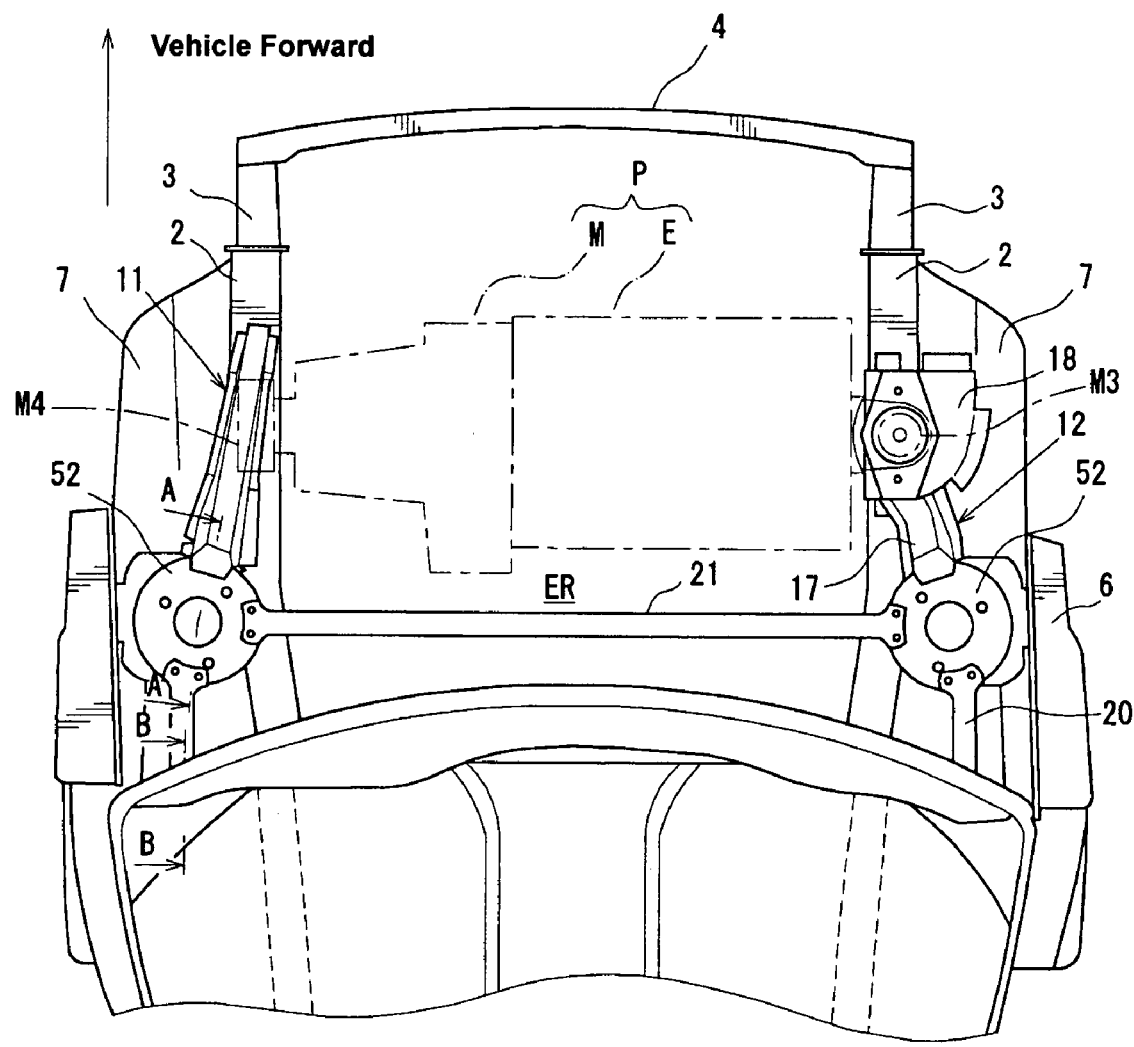
FIG. 4 is a plan view of the vehicle front body structure.
Figure 5:
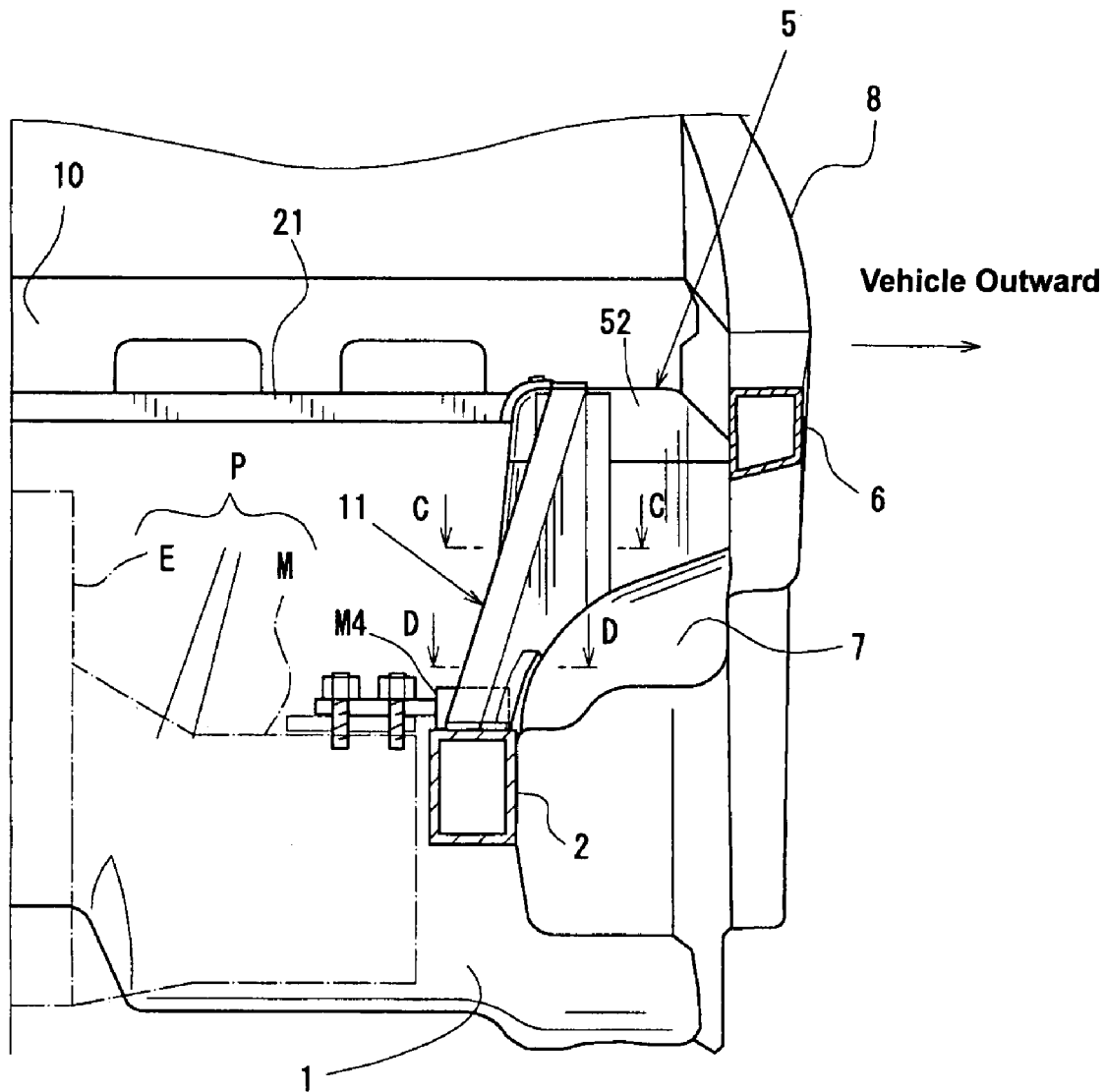
FIG. 5 is an elevation view of the left-side portion of the vehicle front body structure.
Figure 6:
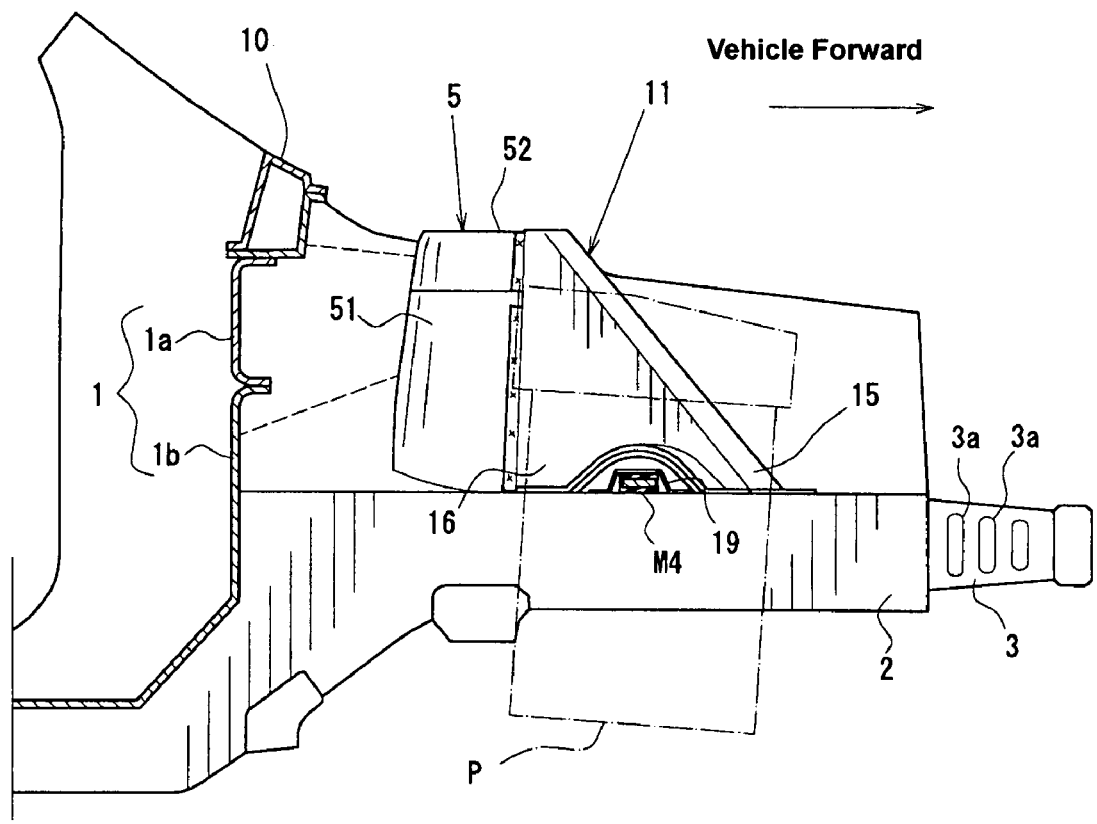
FIG. 6 is a side view of the left-side portion of the vehicle front body structure, when viewed from an inside of an engine room.
Figure 7:
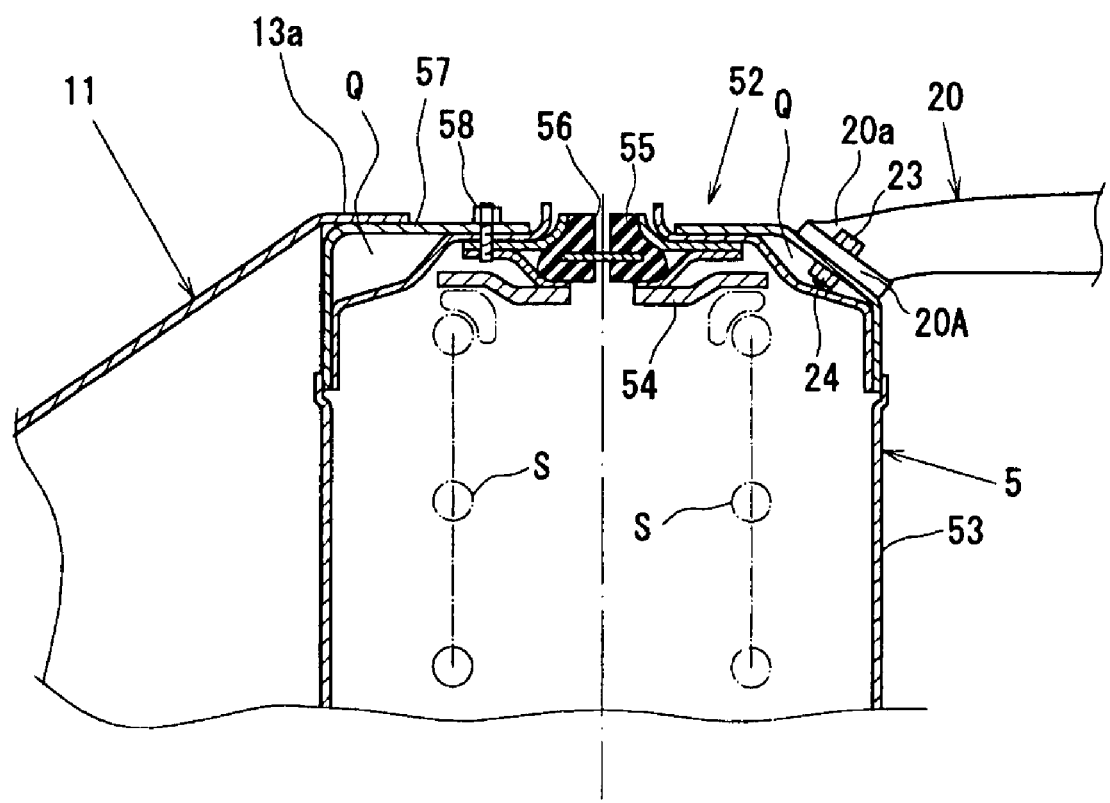
FIG. 7 is a sectional view taken along line A-A of FIG. 4.
Figure 8:
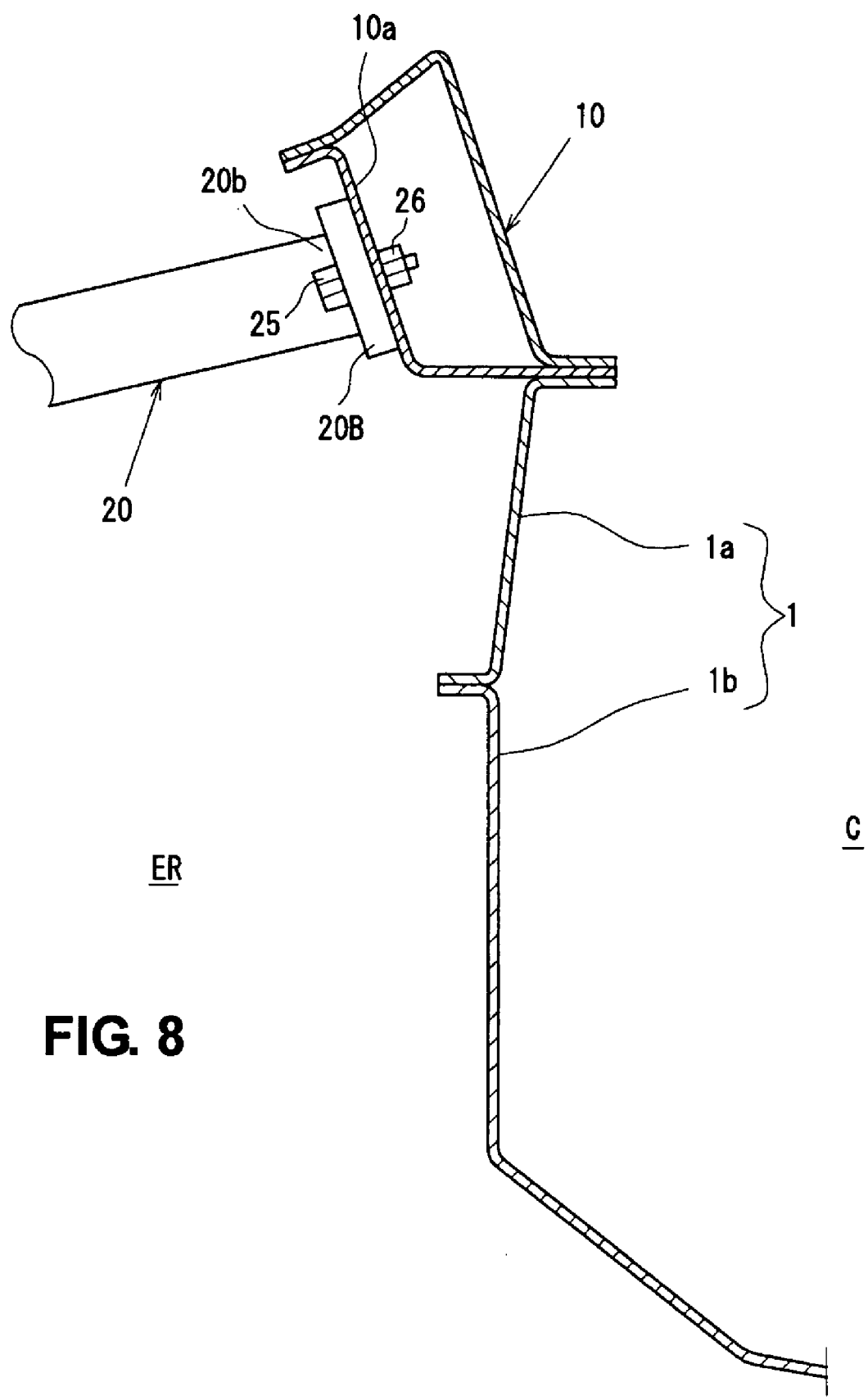
FIG. 8 is a sectional view taken along line B-B of FIG. 4.
Figure 9A:
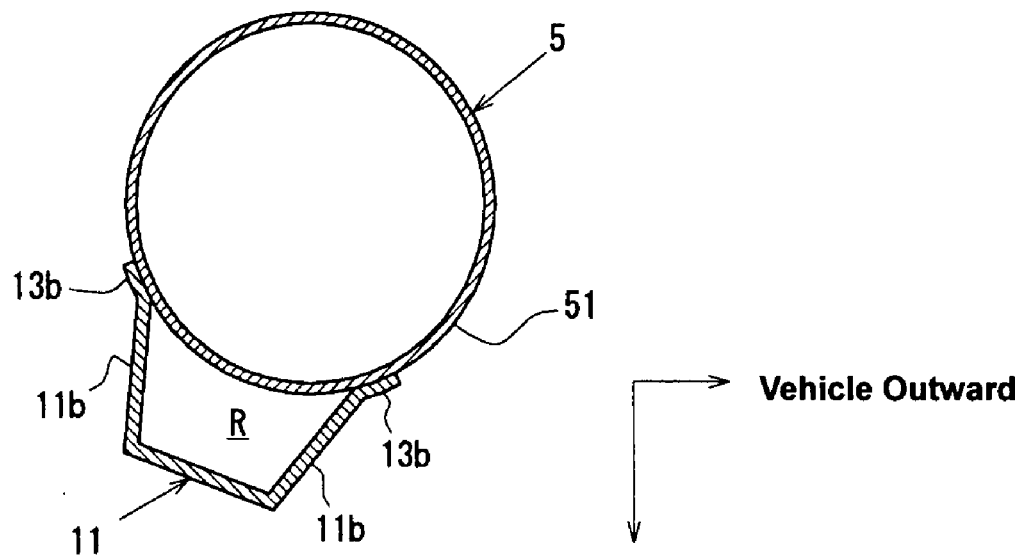
FIG. 9A is a sectional view taken along line C-C of FIG. 5.
Figure 9B:
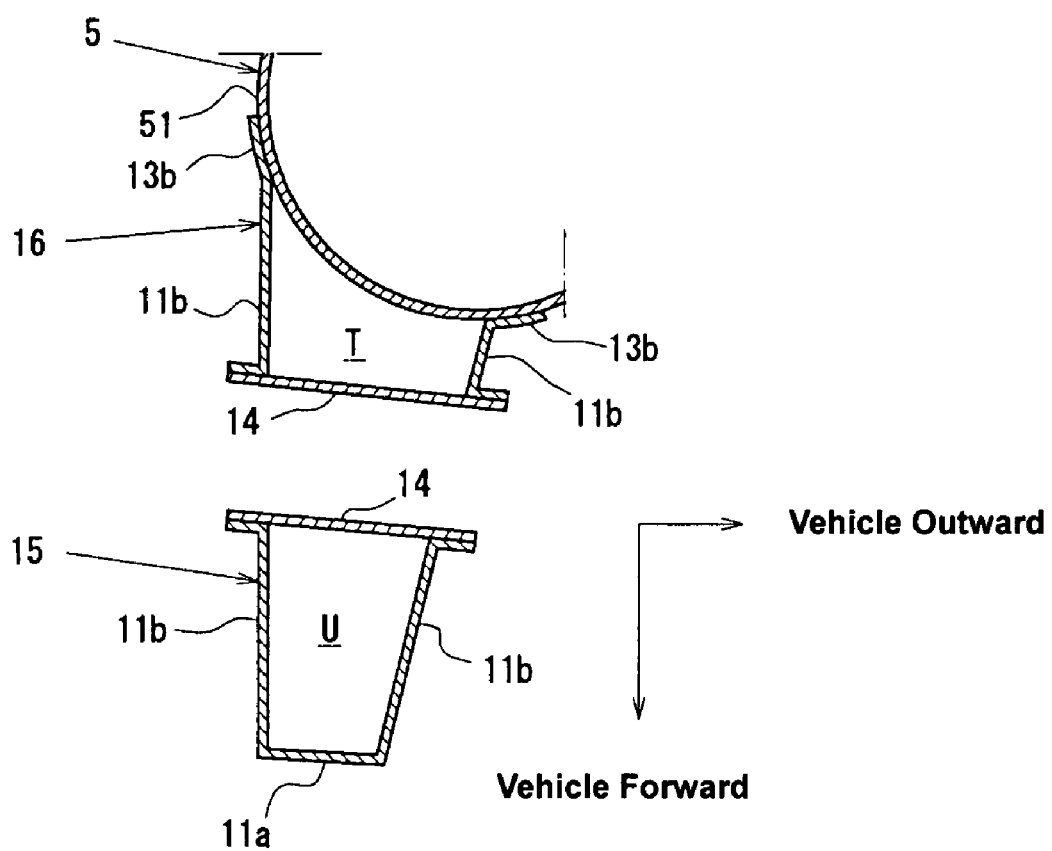
FIG. 9B is a sectional view taken along line D-D of FIG. 5.

First, a first embodiment of the present invention will be described. FIG. 1 is a right-side perspective view showing a left-side portion of a vehicle front body structure of a first embodiment of the present invention. FIG. 2 is a left-side perspective view showing a right-side portion of the vehicle front body structure of the first embodiment of the present invention. FIG. 3 is an exploded perspective view of the left-side portion of the vehicle front body structure. FIG. 4 is a plan view of the vehicle front body structure. FIG. 5 is an elevation view of the left-side portion of the vehicle front body structure. FIG. 6 is a side view of the left-side portion of the vehicle front body structure, when viewed from an inside of an engine room. FIG. 7 is a sectional view taken along line A-A of FIG. 4. FIG. 8 is a sectional view taken along line B-B of FIG. 4. FIG. 9A is a sectional view taken along line C-C of FIG. 5, and FIG. 9B is a sectional view taken along line D-D of FIG. 5. Herein, a side on the right of a driver will be described as the vehicle right side, and a side on the left of the driver will be described as the vehicle left side.

A vehicle front structure of the present embodiment comprises, as shown in FIGS. 1 and 2, a pair of front side frames 2, 2 that projects forward at both sides from a dash panel 1 that partitions a vehicle compartment C from an engine room ER, a pair of crush cans 3, 3 that is provided at front ends of the front side frames 2, 2, a bumper reinforcement 4 that extends in a vehicle width direction and interconnects both front ends of the crush cans 3, 3, a pair of suspension tower portions (hereinafter, referred to as "suspension towers") 5, 5 that is located outside the respective front side frames 2, 2 in the engine room ER so as to stand vertically at both-side inside faces of the engine room, a pair of apron members 6, 6 that is located at both-side upper portions outside the suspension towers 5, 5 so as to extend in a longitudinal direction of the vehicle, wheel aprons 7, 7 that are provided between with the apron members 6, 6 and the front side frames 2, 2 so as to cover front wheels (not illustrated), a pair of front pillars 8, 8 that extends vertically behind the apron members 6, 6, hinge towers 9, 9 that extend vertically below the front pillars 8, 8, and a cowl box 10 that extends in the vehicle width direction to interconnect the both-side hinge towers 9, 9 at an upper portion of the dash panel 1.

The front side frames 2, 2 are respectively comprised of an inner panel and an outer panel, which have substantially a U-shaped cross section (not illustrated) respectively and are joined to each other, so as to respectively form rigid and rectangular closed cross sections that extend in the longitudinal direction of the vehicle at both sides (see FIG. 5). The front side frames 2, 2 function so as to receive an impact energy that acts in the longitudinal direction at a vehicle frontal crash.

The above-described crush cans 3, 3 are made of a rectangular cylindrical member respectively, which includes weak portions 3a . . . (see FIG. 6) so that each of the crush cans 3, 3 can be crushed to properly absorb the impact energy thereby.

The above-described bumper reinforcement 4 is made of a member with a U-shaped cross section that extends in the vehicle width direction, which transmits the impact crash from the front to the crush cans 3, 3. At a front face of the bumper reinforcement 4 is provided a bumper face (not illustrated) that extends in the vehicle width direction.

The above-described suspension towers 5, 5 are made of a circular cylindrical member, lower end portion 5a of which is connected outside the front side frames 2, 2, and in which a damper and the like of a suspension device (not illustrated) are accommodated. The suspension tower 5 comprises a suspension-tower upper portion 52 at its upper end that is formed to be rigid enough to support an upper end 52 of the suspension tower 5 (described below in detail).

The above-described apron members 6, 6 are located at both-side upper edge portions of the engine room ER and include closed cross sections extending in the longitudinal direction. The apron members 6 are located outside the suspension towers 5 and support an impact load acting on the suspension towers 5.

The above-described wheel aprons 7, 7 are made of a panel member that interconnects the front side frame 2 and the apron member 6 and forms an upper side wall of the engine room ER so as to function as a partition wall that partitions the engine room ER from the vehicle outside.

The above-described front pillars 8, 8 include closed cross sections that extend upward obliquely from rear ends of the apron members 6, 6, and extend upward, toward a roof panel (not illustrated).

The above-described hinge towers 9, 9 are located below the front pillars 8, 8 and extend vertically so as to form front side walls of the vehicle compartment C. At the rear ends of the hinge towers 9, 9 are provided pivotal hinges for front doors, not illustrated.

The above-described cowl box 10 includes a closed cross section that extends in the vehicle width direction in a curve shape, and is connected to the upper portion of the dash panel 1 (see FIGS. 6 and 8) to improve the rigidity of the upper portion of a front end of the vehicle compartment. The dash panel 1 extending the vehicle width direction is comprised of a dash upper 1a and a dash lower 1b.

In the present embodiment, in order to improve the function of the vehicle front body structure against the vehicle crash, there are further provided bridge-shaped frame members 11, 12 that interconnect the front side frames 2 and the suspension-tower upper portions 52, connecting members 20, 20 that interconnect the suspension-tower upper portions 52 and the cowl box 10, and a suspension-tower bar 21 that interconnects the both-side suspension-tower upper portions 52, 52.

The left-side frame member 11 comprises, as shown in FIG. 3, a bracket 13 that is of substantially a triangular shape, when viewed from the side, and has a U-shaped cross section, which includes plural connecting flanges 13a, 13b, 13c and 13d at its periphery and a back plate 14 that is formed in a curve shape and connected to its arc-shaped cut-away lower portion 13e so as to cover part of a lower face of the bracket 13.

The left-side bridge-shaped frame member 11 has a slant face 11a at its front face and vertical wall faces 11b, 11b at its both sides. Further, it includes at its lower portion a front base portion 15 to be connected to a front portion of the front side frame 2 and a rear base portion 16 to be connected to a rear portion of the front side frame 2. Herein, a stride portion 11c is formed at the lower portion of the frame member 11 in such a manner that part of the lower portion of the frame member 11 is cut away in substantially a semicircle shape.

The bridge-shaped frame member 11 is disposed on the front side frame 2 in front of the suspension tower 5 so as to extend vertically and stride over a No. 4 mount M4, which will be described below, as shown in FIG. 1. Namely, the upper connecting flange 13c at an upper end of the bridge-shaped frame member 11 is connected to the upper face of the suspension-tower upper portion 52, the rear connecting flange 13b of the frame member 11 is connected to a side wall face 51 of the suspension tower 5 so as to extend vertically, the front connecting flange 13c of the front base portion 15 is connected to a portion of the front side frame 2 that is located in front of the No. 4 mount M4, and the rear connecting flange 13d of the rear base portion 16 is connected to a portion of the front side frame 2 that is located in back of the No. 4 mount M4. Thereby, the frame member 11 that has the rigid closed cross section extending vertically and longitudinally is disposed in front of the suspension tower 5.

The upper connecting flanges 13b, 13b of the frame member 11 are connected to the side wall face 51 of the suspension tower 5, as shown in a sectional view of FIG. 9A, so a closed cross section R is formed with the side wall face 51 of the suspension tower 5 to ensure the rigidity of the frame member 11. In particular, since the closed cross section R is formed by using the side wall face 51 of the suspension tower 5, the rigidity of the frame member 11 can be increased by utilizing a high rigidity of the suspension tower 5.

Also, at the lower portion of the frame member 11, as shown in FIG. 9B, the rear base portion 16 of the frame member 11 forms a closed cross section T with the side wall face 51, vertical wall face 11b, and back plate 14, and the front base portion 15 of the frame member 11 forms a closed cross section U with back plate 14, vertical wall face 11b, and slant face 11a. Thereby, the rigidity of the lower portion of the frame member 11 can be also increased.

Meanwhile, the right-side frame member 12 is comprised of a bracket 17 that has a U-shaped cross section and is disposed in front of the suspension tower 5, as shown in FIG. 2. The frame member 12 is connected to the front face of the suspension tower 5 so as to form a closed cross section that extend vertically along with the side wall face 51 of the suspension tower 5.

Also, in front of the frame member 12 is provided a box-shaped mount attaching portion 18 for attaching a No. 3 mount M3, which will be described below. The frame member 12 and the front side frame 2 are connected via the mount attaching portion 18.

These right-and-left frame members 11, 12 are disposed obliquely in such a manner that a distance between them gradually becomes wider toward the rear of the vehicle, as shown in FIG. 4 in a plan view. Namely, the left-side frame member 11 is provided to extend substantially straightly so as to directly interconnect the upper portion 52 of the suspension tower 5 and the front side frame 2. Herein, the left-side frame member 11 has its bridge shape like striding the No. 4 mount M4 as described above, so a portion of the front side frame 2 that is located in front of the No. 4 mount M4 and the upper portion 52 of the suspension tower 5 are directly interconnected by the left-side frame member 11 extending substantially straightly over the No. 4 mount M4. Meanwhile, the right-side frame member 12 is provided to extend substantially straightly so as to indirectly interconnect the upper portion 52 of the suspension tower 5 and the front side frame 2 via the box-shaped mount attaching portion 18. Herein, the box-shaped mount attaching portion 18 has a larger plan area than that of the No. 3 mount M3 and thereby its connecting portion to the side frame 2 that is located in front of the No. 3 mount M3 as shown in FIG. 2, which will be described later in detail. Accordingly, likewise, a portion of the front side frame 2 that is located in front of the No. 3 mount M3 and the upper portion 52 of the suspension tower 5 are directly interconnected by the right-side frame member 12 extending substantially straightly toward the No. 3 mount M3.

At central portions of the front side frames 2, 2 in the longitudinal direction are provided the engine mounts M3, M4 to support a power plant P that comprises an engine E, mission M and others and is disposed laterally, which is shown by an one-dotted broken line. On the right side is provided the No. 3 mount M3 comprised of a circular cylindrical mount that is provided at the above-described mount attaching portion 18. On the left side is provided the No. 4 mount M4 that comprised of a rectangular mount that is provided below the above-described frame member 11.

The No. 4 mount M4 is directly fixed to the front side frame 2 via an attaching bracket 19 so as to located between the front base portion 15 and the rear base portion 16 of the frame member 11 as shown in FIG. 6. The No. 4 mount M4 supports the power plant P in a relatively low position.

The No. 4 mount M4 is disposed in this way, so the bridge-shaped frame member 11 located above this mount M4 can be provided so as to extend substantially straightly in the substantially longitudinal direction of the vehicle, so that a structure in which the front portion of the front side frame 2 and the suspension-tower upper portion 52 are straightly connected can be provided. Thereby, the impact energy acting on the front side frame can be properly transmitted to the suspension-tower upper portion 52 by using the hard axial rigidity of this straightly-extending structure without generating any improper bending of the front side frame 2.

Detailed structure of the No. 3 mount M3, frame member 12 and their surrounding parts that are disposed on the right side will be described later referring to FIGS. 14 to 20.

The connection structure between the suspension-tower upper portion 52 and the frame member 11 will be described referring to FIG. 7. The suspension tower 5 comprises a circular cylindrical body portion 53 with its upper closed end, and the body portion 53 has a receiving portion 54 to hold a coil spring S of the suspension device inside thereof. At a center of the body portion 53 is formed a through hole 56 for receiving a damper shaft, not illustrated, via a rubber bush 55. A circular cap-shaped reinforcing member 57 is fixed to an upper portion of the body portion 53 via bolts 58 or the like, which forms the rigid suspension-tower upper portion 52. A space Q enclosed by the body portion 53 and the reinforcing member 57 has a ring-shaped closed cross section in the plan view, which increases the rigidity of the suspension-tower upper portion 52.

To this rigid suspension-tower upper portion 52 is fixed the upper connecting flange 13a of the frame member 11. Thereby, the frame member 11 is connected to the suspension-tower upper portion 52.

The above-described connecting member 20 is made of a rectangular pole member that is made from a light-metal alloy casting such as aluminum, and its front end portion 20a is fastened to the suspension-tower upper portion 52 and its rear end portion 20b is fastened to the front face portion of the cowl box 10 as shown in FIG. 1.

A connecting flange 20A of the front end portion 20a of the connecting member 20 is fastened to the closed cross section Q formed by the reinforcing member 57 and the body portion 53 via bolts 23 and nuts 24 as shown in FIG. 7. Thus, the connection structure of the connecting member 20 to the suspension-tower upper portion 52 is provided.

A connecting flange 20B of the front end portion 20b of the connecting member 20 is fastened to the front face 10a (front panel) of the cowl box via bolts 25 and nuts 26 as shown in FIG. 8. Thus, the connection structure of the connecting member 20 to the cowl box 10 is provided.

Also, the suspension-tower bar 21 is made of a rectangular pole member that is made from a light-metal alloy casting such as aluminum, which extend in the vehicle width direction to interconnect the both suspension-tower upper portions 52, 52 as shown in FIG. 1. This bar 21 is also fastened to the suspension-tower upper portions 52 reinforced with the reinforcing members via bolts and nuts (not illustrated), like the connecting members 20.

Figure 10A:
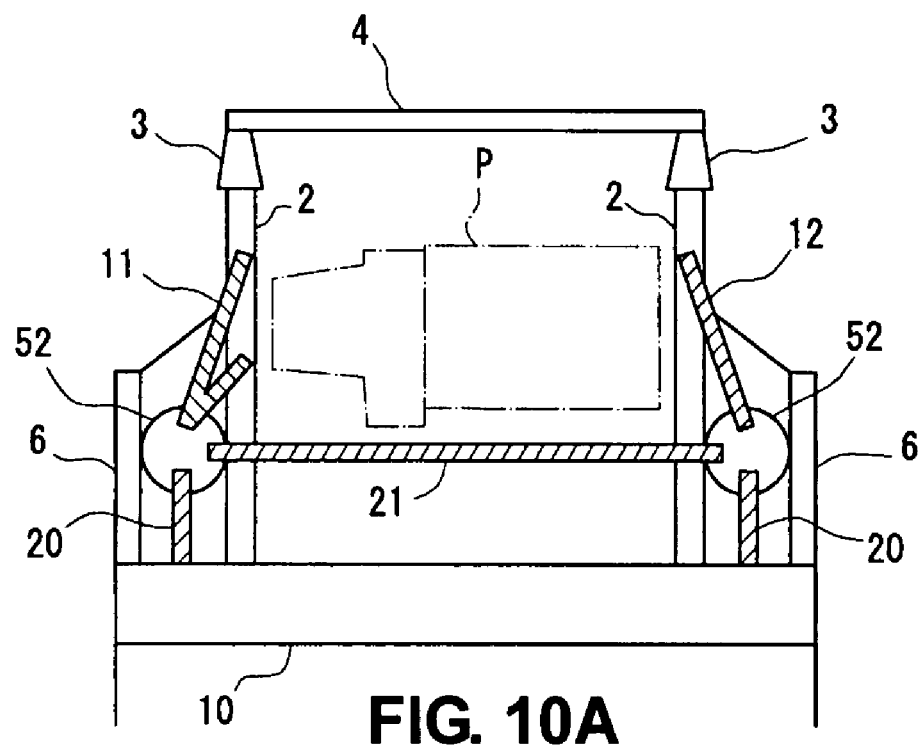
FIGS. 10A, 10B are plan views showing a move of the structure of the present embodiment at a vehicle crash.
Figure 10B:
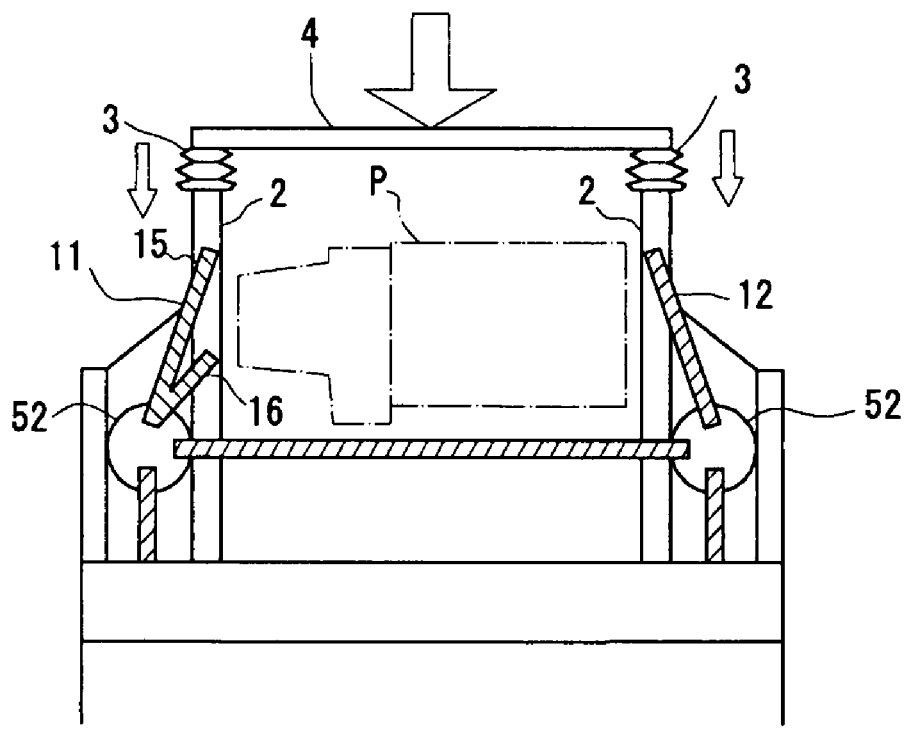
Figure 11A:
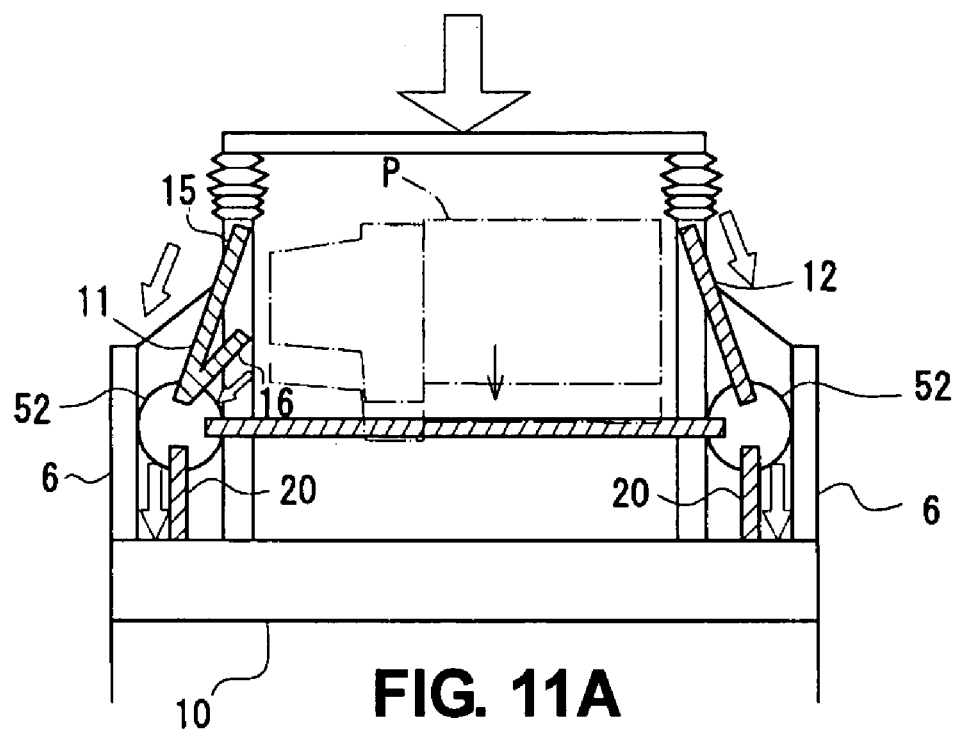
FIGS. 11A, 11B are plan views showing a move of the structure of the present embodiment at the vehicle crash.
Figure 11B:
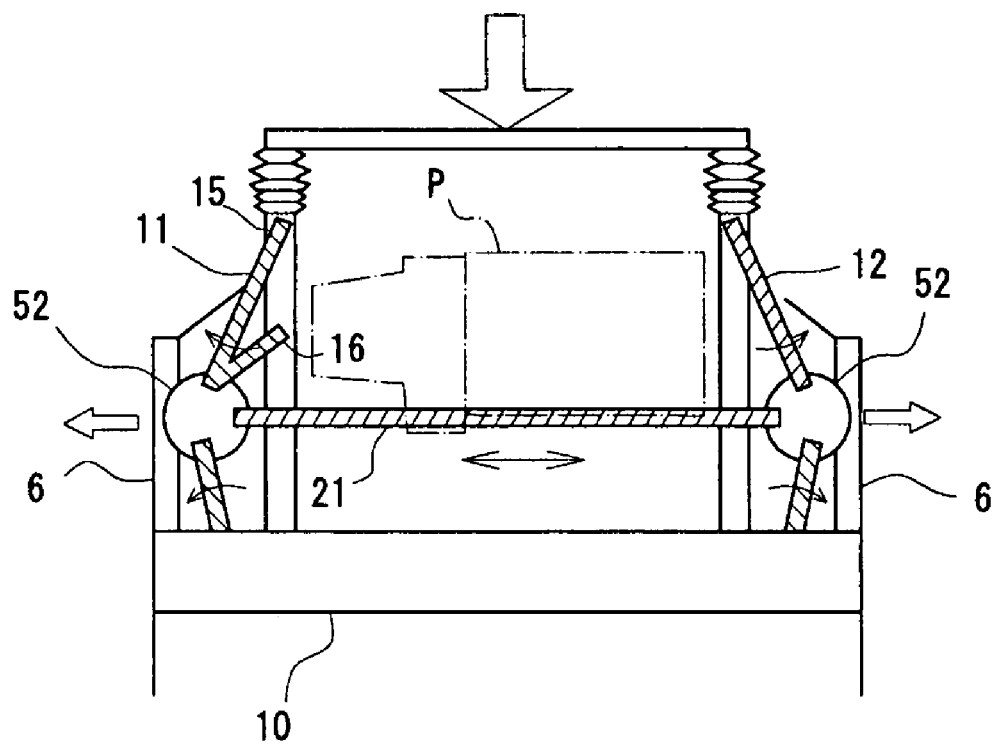

Next, the operation of the above-described vehicle front body structure at the vehicle frontal crash will be described referring to plan schematic views of FIGS. 10A, 10B and 11A, 11B. Herein, FIG. 10A shows a stage before the crash, FIG. 10B shows an initial stage of the crash, FIG. 11A shows a middle stage of the crash, and FIG. 11B shows a latter stage of the crash. The same components as those shown in FIGS. 1 to 9 are denoted by the same reference characters, and their descriptions are omitted here.

During a period from the initial stage to the middle stage of the crash, the bumper reinforcement 4 moves rearward and the crush cans 3, 3 are crushed, so the impact energy at the initial stage of the vehicle frontal crush can be absorbed. Also, the frame members 11, 12 transmit the impact energy from the front side frames 2, 2 to the suspension-tower upper portions 52, 52, so the impact energy can be properly prevented from concentrating on the front side frames 2, 2. Herein, since the left-side frame member 11 does not support the power plant P, the impact energy can be directly transmitted to the suspension-tower upper portions 52. At this stage, the impact energy is mainly transmitted from the front base portion 15 to the suspension-tower upper portions 52.

Then, as the crash proceeds from the middle stage to the later stage, the impact energy from the front side frames 2, 2 and the rearward-moving energy of the power plant P (energy of the power plant P moving rearward) are transmitted from the frame members 11, 12 to the suspension-tower upper portions 52. Herein, at the left-side frame member 11, the rearward-moving energy of the power plant P is transmitted to the suspension-tower upper portions 52 from the rear base portion 16 of the frame member 11 for the first time. The energy is also transmitted to the cowl box and the like via the connecting members 20, 20.

As the crash further proceeds, the suspension-tower upper portions 52, 52 are forced to move outward, receiving loads from the frame members 11, 12. Namely, since the frame members 11, 12 are disposed obliquely as described above, the load to move the suspension-tower upper portions 52 outward acts.

This outward movement of the suspension-tower upper portions 52, 52 generates a tension load acting on the suspension-tower bar 21 interconnecting the suspension-tower upper portions 52, 52 in the vehicle width direction, i.e., its axial direction, so there occurs a plastic deformation at the suspension-tower bar 21 with this tension load.

Herein, in a certain case where an input direction of the crash load changes like a vehicle off-set crash, there may occur an inward-movement of the suspension-tower upper portions 52, 52 in which the portions move inward. In this case, a compression load acts on the suspension-tower bar 21, so there occurs a plastic deformation at the suspension-tower bar 21 with this compression load.

Also, since the impact energy from the vehicle front is directly transmitted to the suspension-tower upper portions 52 at the left-side frame member 12 as described above, the lateral movement of the suspension-tower upper portions 52 can be further generated actively.

Accordingly, since the impact energy acting on the front side frames 2, 2 is widely transmitted to the suspension-tower upper portions 52, 52, apron members 6, 6, cowl box 10, and suspension-tower bar 21, the improper bending of the front side frames 2, 2 can be suppressed and thereby the axial-direction compressive deformation of the front side frames 2, 2 can be properly generated.

Next, the operation and effects of the present embodiment will be described. According to the present embodiment, the No. 4 mount M4 to support the power plant P is disposed at the portion of the front side frame 2 in front of the suspension tower 5, the bridge-shaped frame member 11 that interconnects the suspension-tower upper portion 52 and the portion of the front side frame that is located in front of the No. 4 mount M4 is provided, wherein the bridge-shaped frame member 11 is provided so as to extend substantially straightly over the No. 4 mount M4.

Thereby, the proper transmission of the impact crush can be attained with the bridge-shaped frame member 11, without any improper influence of the provision of the No. 4 mount M4 at the front side frame. Thus, without any change of support point of the power plant P (disposition location of the engine mount), the impact energy acting on the side front frame 2 can be properly transmitted to the suspension-tower upper portion 52 by the frame member 11. Accordingly, in the vehicle front body structure in which the impact energy acting on the front side frame 2 is transmitted to the vehicle upper body portion, the engine mount is properly disposed on the front side frame 2, and also the impact energy is properly transmitted to the vehicle upper body portion by the frame member 11, so that the improper bending of the front side frames 2 can be suppressed and the proper energy absorption of the front side frame 2 with the axial-direction compression can be attained.

Further, since the above-described energy transmission to the vehicle upper portion is attained at the portion in front of the No. 4 mount M4 supporting the power plant P, there is no need for decreasing the rigidity of the rear portion of the front side frame 2 in order to ensure the impact absorption function. Accordingly, the frame rigidity at the support point of the power plant P can be improved with brackets or the like, so the support rigidity of the power plant P can be properly improved.

Also, the bridge-shaped frame member 22 forms the closed cross section R extending vertically with the side wall face 51 of the suspension tower. Thereby, the frame member 11 can increase the rigidity by using the rigid suspension tower 5. Accordingly, even the great impact energy can be properly transmitted to the suspension-tower upper portion 52. Also, the frame member 11 is formed in the bridge shape, having the front base portion 15 and the rear base portion 16 so as to stride over the No. 4 mount M4. Thereby, in case of a relatively light crash, the impact energy from the front base portion 15 is transmitted to the suspension-tower upper portion 52, while in case of a relatively heavy crash, the rearward-moving energy of the power plant P from the rear base portion 16 is transmitted to the suspension-tower upper portion 52. Accordingly, the amount of energy to be transmitted to the suspension-tower upper portion 52 can be changed according to the impact degree, and the impact transmission by the bridge-shaped frame member 11 can be properly attained.

Also, the front base portion 15 and the rear base portion 16 of the bridge-shaped frame member 11 are formed with the stride portion 11c that is formed in such a manner that part of the lower portion of the frame member 11 is cut away in substantially the semicircle shape. (Below the stride portion 11c is disposed the NO. 4 mount M4. Thereby, the front and rear base portions 15, 16 are formed integrally, and the closed cross section of the lower portion of the frame member 11 can be made large. Accordingly, the rigidity of the lower portion of the frame member 11 can be increased and the transmission of the impact energy can be properly attained.

Also, the front side frames 2, 2 and the suspension towers 5, 5 are provided at the both sides, the frame members 11, 12 are disposed obliquely in such a manner that the distance between them gradually becomes wider toward the rear of the vehicle, and the suspension-tower bar 21 extending in the vehicle width direction interconnects the suspension-tower upper portions 52. Thereby, the impact load acting on the front side frames 2 forces the suspension-tower upper portions 52 to move outward due to the oblique disposition of the frame members 11, 12, so there occurs the plastic deformation at the suspension-tower bar 21 in its axial direction. Thus, the impact energy acting on the front side frames 2 can be properly transmitted and absorbed by utilizing the existing suspension-tower bar 21 that is provided to improve the maneuverability of the vehicle. Namely, the proper absorption of the impact energy can be attained without providing any additional reinforcing members at the vehicle upper body.

Figure 12:
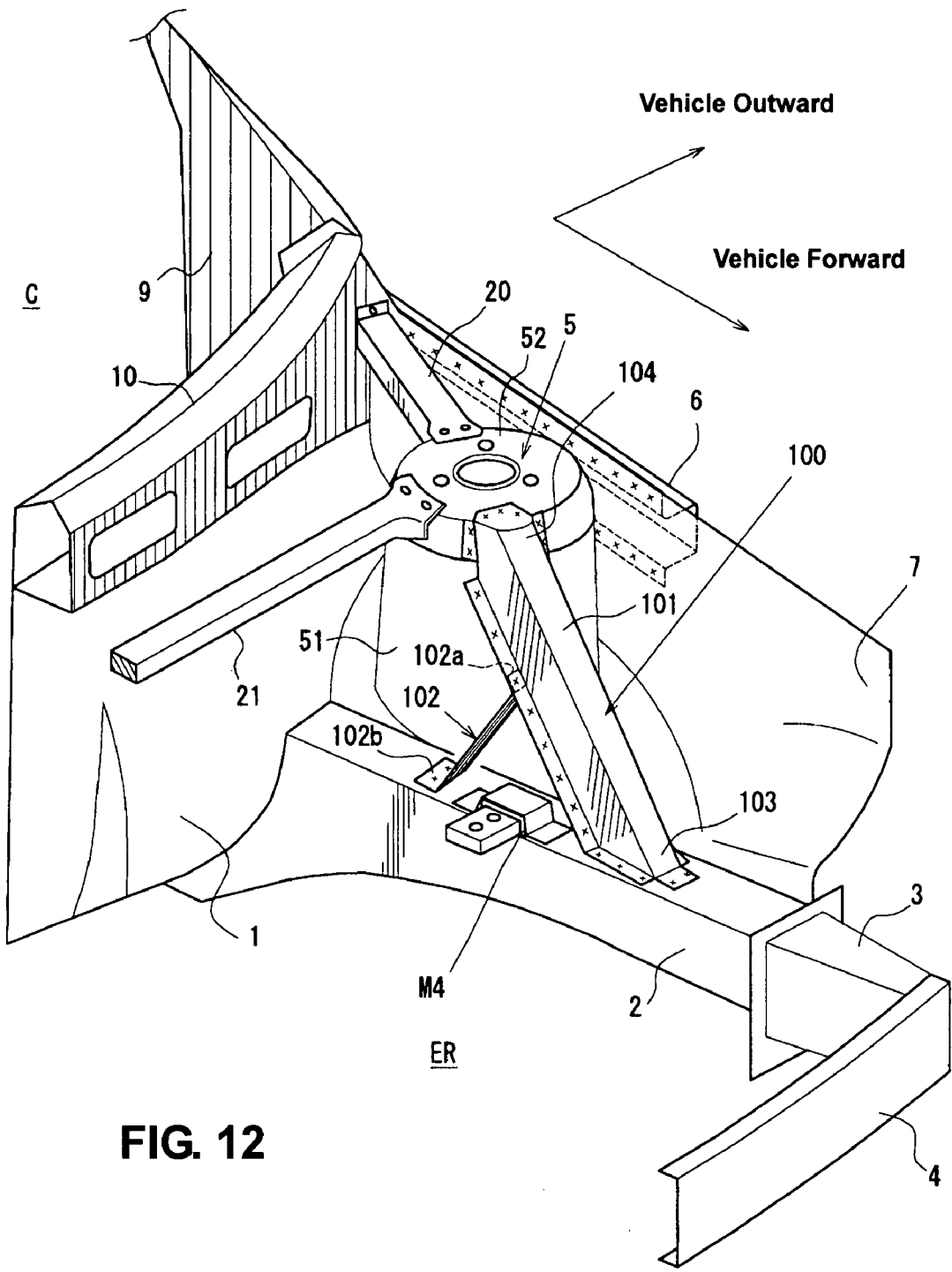
FIG. 12 is a right-side perspective view showing a left-side portion of a vehicle front body structure of a second embodiment.

Next, a modified second embodiment of the left-side frame member will be described referring to FIGS. 12 and 13. In the modified embodiment, in stead of the frame member 11, a frame member 100, which comprises a main frame 101 that extends obliquely downward and straightly and a sub frame 102, is provided in front of the suspension tower 5. The impact energy acting on the front side frame 2 is transmitted to the suspension-tower upper portion 52 by the frame member 100. The same parts as those in the above-described embodiment are denoted by the same reference characters, and their descriptions are omitted here.

Figure 13:
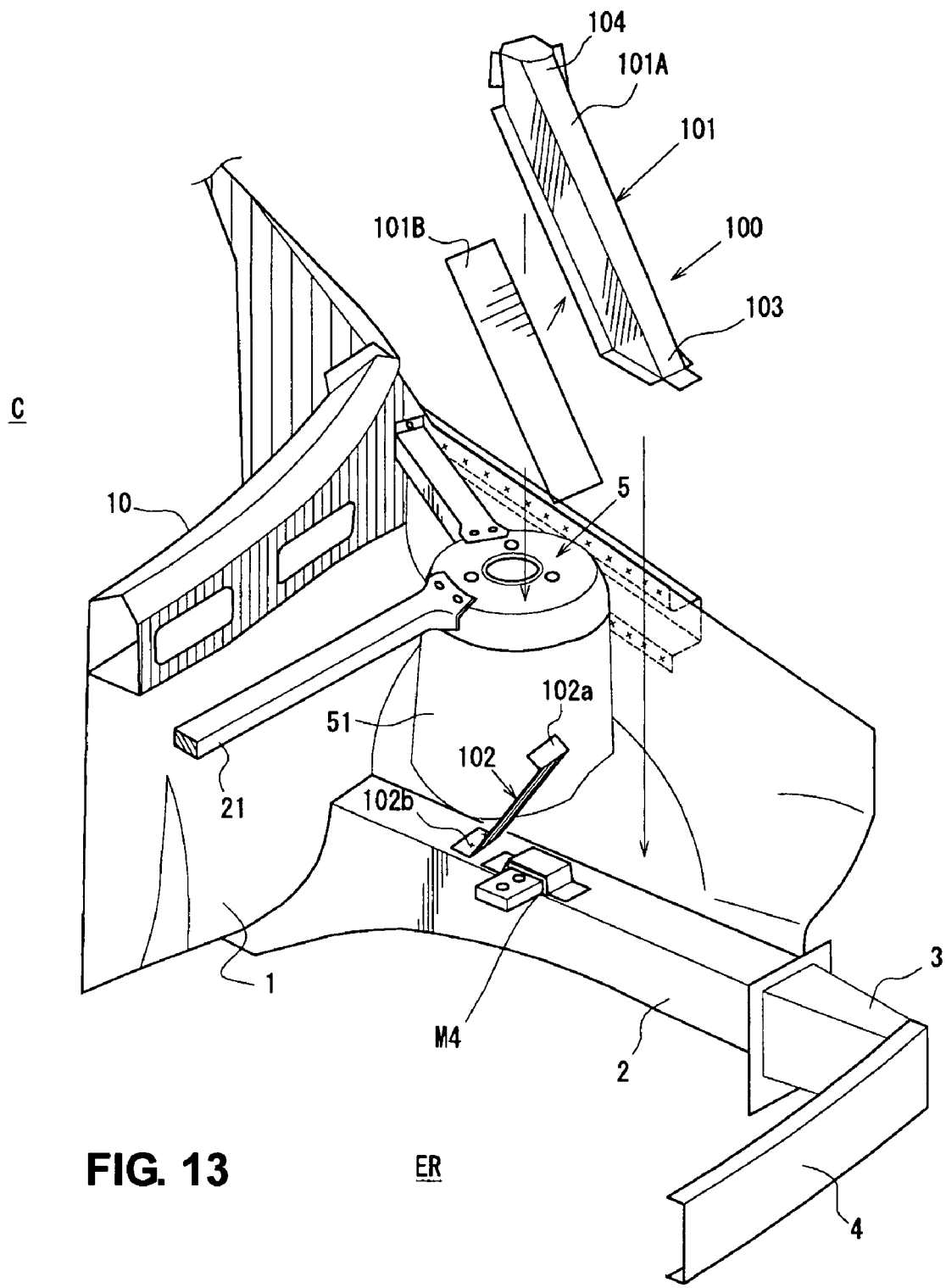
FIG. 13 is an exploded perspective view of the left-side portion of the vehicle front body structure of the second embodiment.

The frame member 100 is comprised of the main frame 101 that is formed with a bracket 101A with a U-shaped cross section and a back plate 101B and the plate-shaped sub frame 102 that is formed in a bent shape with an upper end flange 102a and a lower end flange 102b, as shown in FIG. 13.

The main frame 101 is disposed to interconnect the front side frame 2 and the suspension-tower upper portion 52 in such a manner that its front end portion 103 is connected to a portion of the front side frame 2 that is located in front of the No. 4 mount M4 and its rear end portion 104 is connected to the suspension-tower upper portion 52. The sub frame 102 is disposed in such a manner that its upper end flange 102a is connected to a lower face of a center portion of the main frame 101 and its lower end flange 102b is connected to a portion of the front side frame 2 in back of the No. 4 mount M4.

Accordingly, the frame member 100 can properly transmit the impact energy acing on the front side frame 2 to the suspension-tower upper portion 52 via the main frame 101, preventing an interference with the engine mount, like the above-described embodiment. Also, in case of the great impact, the transmission of the rearward-moving energy of the power plant P to the suspension-tower upper portion 52 can be attained via the sub frame 102. Thus, the improper bending of the front side frame 2 can be suppressed and the axial-direction compressive deformation of the front side frame 2 can be properly generated, like the above-described embodiment.

Also, since the rearward-moving energy of the power plant P is transmitted to the suspension-tower upper portion 52 according to the impact degree, the impact transmission can be attained efficiently.

In particular, since the frame member 100 is comprised of the main frame 101 and the sub frame 102 as described above, forming of the frame member 100 can be made easier and the productivity can be improved.

Compared to the previous embodiment, the lower space of the frame member 100 may be made larger. The provision of the No. 4 mount M4 at the front side frame 2 can be made easier, and thereby assembling of the parts including the power plant P can be improved. The other operations and effects are substantially the same as those of the previous embodiment.

Hereinafter, the structures of the No. 3 mount M3, frame member 12 and their surrounding parts that are disposed on the right side, which is shown in FIG. 2, will be described further in detail referring to FIGS. 14 to 20. The same components shown in FIG. 2 are denoted by the same reference characters.

Figure 14:
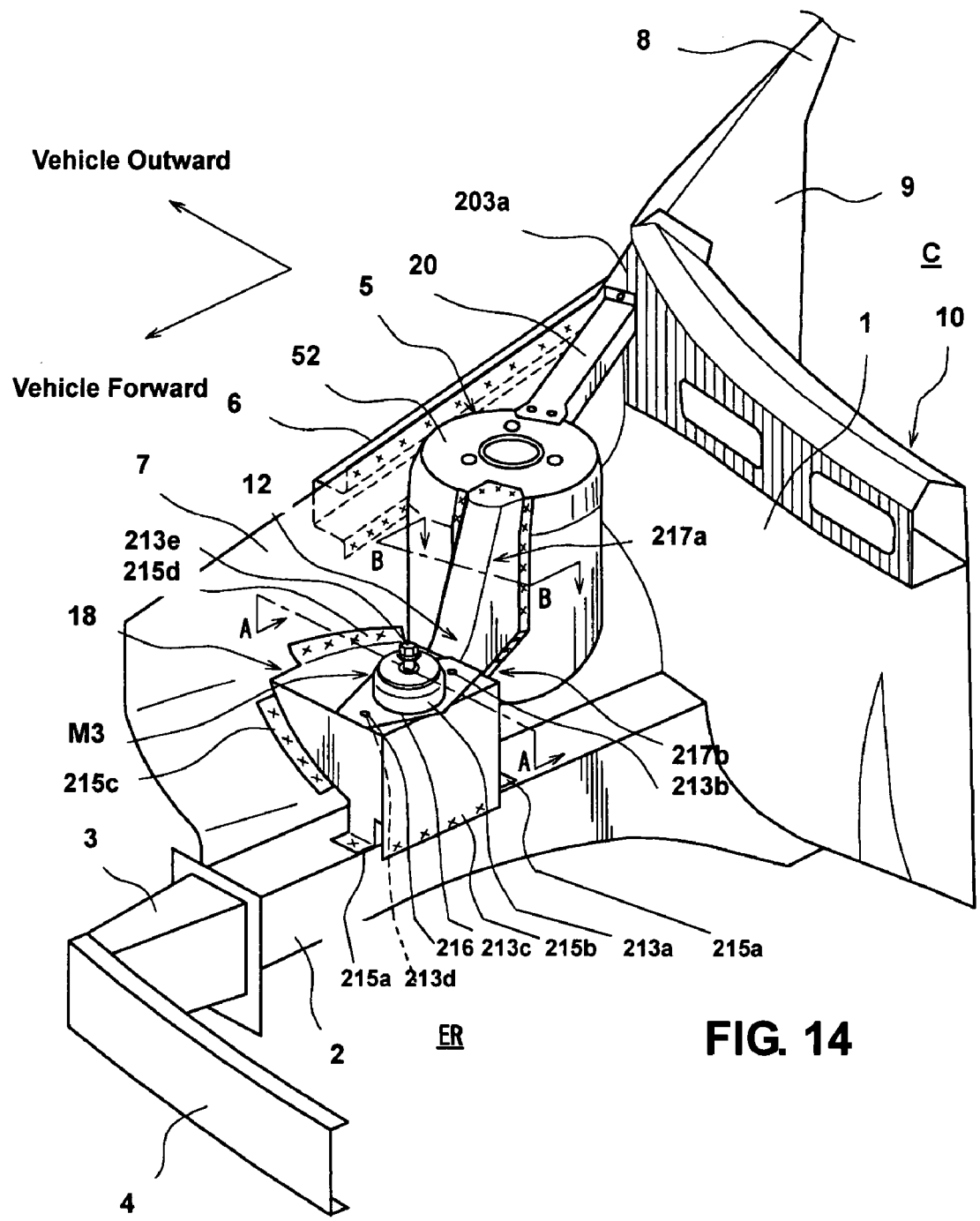
FIG. 14 is a perspective view showing a major portion of the right-side portion of the vehicle front body structure according to the first embodiment of the present invention.

The No. 3 mount M3, shown in FIG. 14 and others, comprises an outer cylinder 213a that covers a periphery of a substantially circular-cylindrical rubber member (not illustrated), through hole 213c, attaching bracket 213b that having bolt holes 213d, and a bolt 213e that projects from a center of the outer cylinder 213a.

The attaching bracket 213b is a plate member that has the through hole 213c at the center thereof. The through hole 213c has a size equivalent to that of the outer cylinder 213a so that the outer cylinder 213a is inserted into the through hole 213c to be formed as an unit.

The No. 3 mount M3 is fixed to the box-shaped mount attaching portion 18 whose lower end portion is welded to the front side frame 2. Specifically, the attaching bracket 213b of the No. mount M3 is fastened to an upper face of the mount attaching portion 18 via bolts 216.

The mount attaching portion 18 is made of a metal plate member that is bent in the box shape, for example, and includes a plurality of flanges 215a, 215a, 215b for connecting to the front side frame 2 at its lower end portions.

The flanges 215a, 215a at front and rear end faces of the mount attaching portion 18 are bent in a L shape and connected to the upper face of the front side frame 2 in front of the suspension tower 5 so that the No. 3 mount M3 is disposed just in front of the suspension tower 5. Meanwhile, the flange 215b on the side of the engine room ER is formed to be continuous to the side face of the mount attaching portion 18, and connected to the side face of the front side frame 2.

Accordingly, since the lower end portions of the mount attaching portion 18 are connected to the upper face and the side face of the front side frame 2 respectively, the mount attaching portion 18 can have a high rigidity against a twist load, and a load acting on the mount attaching portion 18 can be transmitted to plural faces of the front side frame 2.

Figure 15:
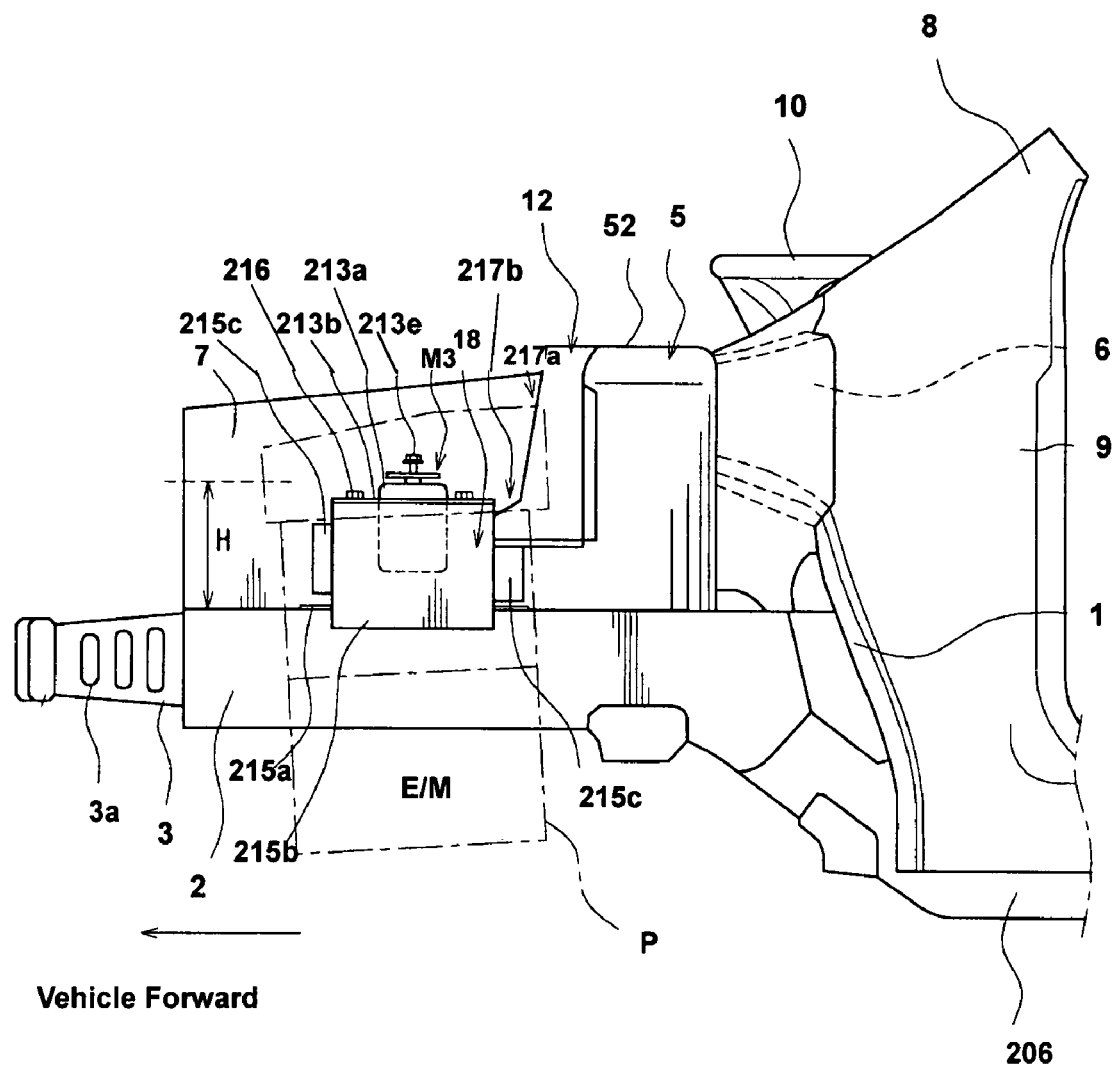
FIG. 15 is a side view showing the major portion of the right-side portion of the vehicle front body structure according to the first embodiment of the present invention.

An outside end portion of the mount attaching portion 18 extends substantially horizontally as shown in FIGS. 14 and 15, and the mount attaching portion 18 includes flanges 215c, 215c at its front and rear ends and an upward-projecting flange 215d at its outside end. The mount attaching portion 18 is connected to the wheel apron 7 and the front face portion of the suspension tower 5 via these flanges 215c, 215c, 215d as well.

Herein, since the mount attaching portion 18 is the box-shaped member with a specified height, as shown in FIG. 15, the No. mount M3 can be located at a level that is higher than the front side frame 2 by a height H. Thus, the support position of the power plant P including the engine E can be high, and thereby a vibration of the power plant P can be properly suppressed.

It is known that the high position support of the power plant P can properly suppress the vibration transmission of the engine E to the vehicle body. Thus, NVH (Noise Vibration Harshness) of the power plant P can be improved.

Herein, the frame member 12 is provided at the front face portion of the suspension tower 5 behind the mount attaching portion 18 (No. 3 mount M3) so as to extend vertically along the front face portion of the suspension tower 5. The frame member 12 comprises a slant portion 217*a* that extends substantially straightly and obliquely as show in FIG. 15 and a forward-projecting portion 217*b* that is connected to the mount attaching portion 18.

Also, behind the suspension tower 5 is provided the connecting member 20 extending straightly in the vehicle longitudinal direction so as to interconnect the upper portion 52 of the suspension tower 5 and a front panel 203*a* of the cowl box 10.

Next, the attachment structure of the mount attaching portion 18 and the frame member 12 will be described referring to an exploded perspective view of FIG. 16 and a sectional view of FIG. 17. A opening 215*e* is formed at the upper face of the mount attaching portion 18, and the outer cylinder 213*a* of the No. mount M3 is inserted into the opening 215*e*. A lower portion of the No. mount M3 is stored in a space enclosed by the mount attaching portion 18, wheel apron 7, and front side frame 2. Then, the bolts 216 are inserted into the bolt holes 213*d*, 213*d* of the attaching bracket 213*b* on the side of the No. 3 mount M3 and bolt holes 215*f*, 215*f* of the upper face of the mount attaching portion 18, thereby fixing the No. 3 mount M3 to a specified position.

The opening 215*e* is of a circular shape, corresponding to the shape of the outer cylinder 213*a*. Thus, part of the outer cylinder 213*a* that is stored in the mount attaching portion 18 is sealed up, so heated air of the engine room ER (see FIG. 14 and the others) can be shut up here and thereby the rubber member in the outer cylinder 213*a* can be protected from the heated air.

When the vehicle has the frontal crash, the rearward-moving energy by the power plant P is generated addition to the impact energy acting on the front side frame 2. This rearward-moving energy is transmitted to the front frame 2 via the No. 3 mount M3.

Herein, since the No. 3 mount M3 is fixed to the box-shaped mount attaching portion 18 and its lower end portions are connected to the front side frame 2 at the plural points via the flanges 215*a*, 215*b*, the energy can be properly transmitted to plural locations at these flanges. Thereby, any improper breakage of the mount attaching portion 18 can be prevented, so the rearward-moving energy can be transmitted to the front side frame 2 properly.

This mount attaching portion 18 of the present embodiment may be superior to a conventional mount attaching portion whose lower end has plural long leg portions to be connected to the front side frame.

Also, since the mount attaching portion 18 is connected to the wheel apron 7 at its outside end portion extending substantially horizontally, the vibration energy of the engine E at the vehicle traveling in addition to the rearward-moving energy at the vehicle frontal crash can be transmitted to the wheel apron 7 as well as the front side frame 2, the support rigidity of the No. 3 mount M3 with the mount attaching portion 18 can be improved.

Figure 17A:
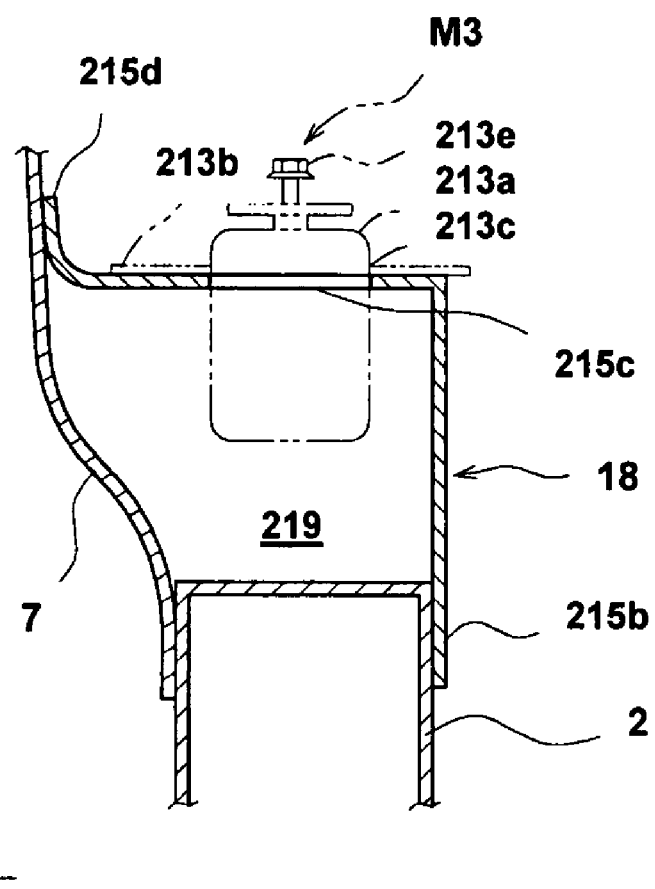
FIG. 17A is a sectional view taken along line A-A of FIG. 14.

Also, a closed cross section 219 is formed by the wheel apron 7 and the front side frame 2 as shown in FIG. 17A (a sectional view taken along line A-A of FIG. 14). The closed sectional view 219 can improve the support rigidity of the No. 3 mount M3.

Figure 16:
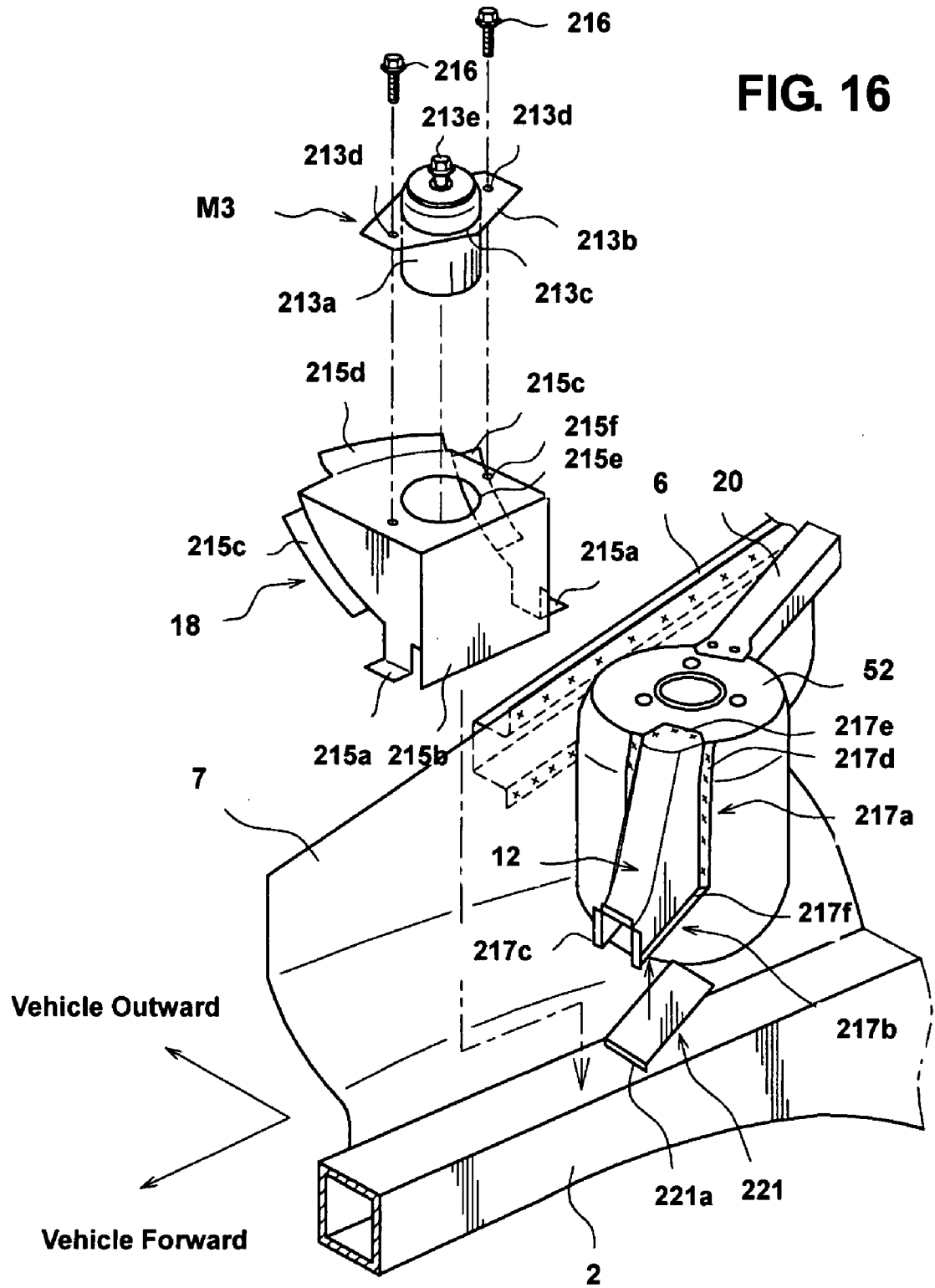
FIG. 16 is an exploded perspective view showing the major portion of the right-side portion of the vehicle front body structure according to the first embodiment of the present invention.

Also, since the mount attaching portion 18 is connected to the front face portion of the suspension tower 5 via the rear flange 215*c* shown in FIG. 16, the vibration energy of the engine E at the vehicle traveling can be transmitted to the suspension tower 5 as well as the front side frame 2. Accordingly, the burden of the front side frame 2 due to the transmission of the rearward-moving energy is reduced, so the energy absorption with the axial compression of the front side frame 2 can be properly attained.

A rear end face of the mount attaching portion 18 is connected to the lower end portion of the frame member 12 by welding. The lower end portion of the frame member 12 forms the forward-projecting portion 217*b*, and at a tip of the forward-projecting portion 217*b* is provided a flange 217*c*. The flange 217*c* is connected to the rear end face of the mount attaching portion 18.

The frame member 12, which has a U-shaped cross section, includes flanges 217*d* that extend vertically at its both ends. Also, the frame member 12 has a flange 217*e* that makes substantially a flat face with the upper portion 52 of the suspension tower 5 at its upper end portion. The frame member 12 is connected to the front face portion of the suspension tower 5 via these flanges 217*d*, 217*e* by welding, so that a closed cross section 220 is formed at the front face portion of the suspension tower 5, which continuously extends vertically as shown FIG. 17B (sectional view taken along B-B of FIG. 14).

Since the frame member 12 and the mount attaching portion 18 are connected to the suspension tower 5 as described above, the No. 3 mount M3 and the lower end portion of the frame member 12 are connected and the upper portion 52 of the suspension tower 5 and the mount attaching portion 18, namely the No. 3 mount M3 are connected.

Thereby, the rearward-moving energy of the power plant P at the vehicle (frontal crush can be transmitted to the vehicle upper body portion via the upper portion of the suspension tower 5 and the apron member 6. Namely, the frame member 12 can properly transmits the above-described rearward-moving energy to the vehicle upper body portion as well as the front side frame 2 at the vehicle lower body.

Accordingly, by transmitting the influence of the rearward movement of the power plant P at the vehicle frontal crash, the burden of the front side frame 2 can be reduced and thereby the energy absorption by the front side frame 2 with its axial compression can be properly attained.

Further, the lower end portion of the mount attaching portion 18 of the present embodiment is connected to the front face portion of the frame member 12 via the flange 217*c*, so the No. 3 mount M3 is connected to the frame member 12. Thereby, since the above-described rearward-moving energy can be properly transmitted to the upper portion of the suspension tower 5, the burden of the front side frame 2 due to the rearward-moving energy can be surely reduced.

Herein, the connection of the mount attaching portion 18 and the frame member 12 may not be indispensable when transmitting the rearward-moving energy of the power plant P to the upper portion of the suspension tower 5. For example, the rear end portion of the mount attaching portion 18 may just contact the front tip of the frame member 12. Or, there may be provided a short-distance gap between the rear end portion of the mount attaching portion 18 and the front tip of the frame member. Herein, this gap can be configured so as to shorten and eventually allow the mount attaching portion 18 to contact the frame member when the mount attaching portion 18 moves rearward due to the above-described rearward-moving energy.

Figure 17B:
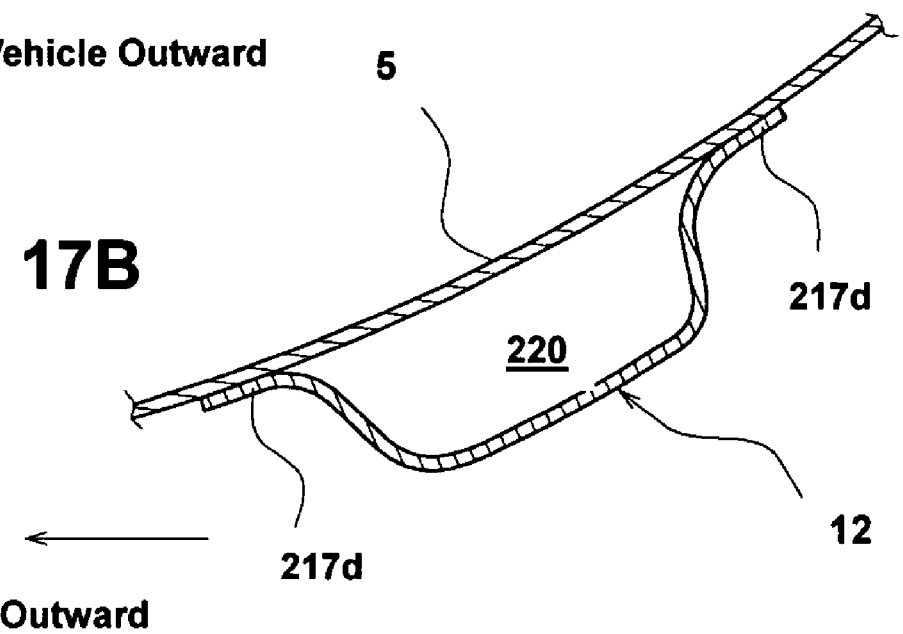
FIG. 17B is a sectional view taken along line B-B of FIG. 14.
Figure 18:
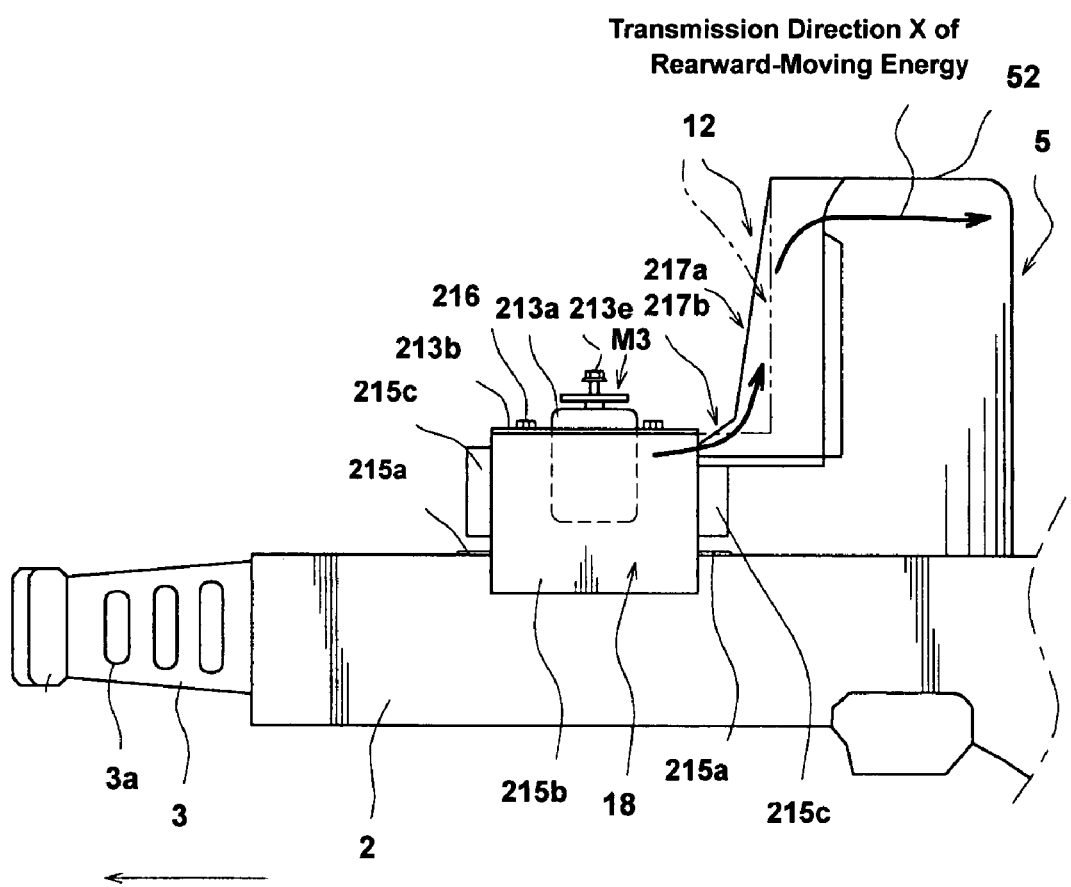
FIG. 18 is a side view explaining a direction of transmission of a rearward-moving energy at a vehicle frontal crash.

Since the frame member 12 is formed to have the U-shaped cross section as described above, it forms the closed cross section 220 with the front face portion of the suspension tower 5 as shown in FIG. 17B. This structure with the closed cross section 220 can improve the rigidity of the frame member 12.

Further, the frame member 12 has the forward-projecting portion 217b, whose lower portion is open, that has no closed cross section as shown in FIG. 16. Thus, the forward-projecting portion 217b has flanges 217f at its both sides, and its lower open area is covered with a bottom plate member 221, thereby providing a continuous closed cross section. Herein, the plate member 221 has a flange 221a at its front, which is welded to the rear end portion of the mount attaching portion 18.

In the present invention, it may not be necessary to form the closed cross section 220 with the frame member 12. For example, both ends of a frame member may be connected to the mount attaching portion 18 (No. mount M3), the upper portion 52 of the suspension tower 5 respectively, and this bridge-shaped frame member may be applied as the frame member 12. In this case, although no closed cross section is formed by the frame member, the above-described rearward-moving energy can be transmitted to the upper portion 52 of the suspension tower 5 via this bridge-shaped frame member.

As described above, the frame member 12 has the slant portion 217a that hat extends substantially straightly and obliquely. This is because if the frame member 12 is configured to have a L shape and extend substantially vertically as shown by a two-dotted broken line in FIG. 18, the above-described rearward-moving energy would not be transmitted to the upper portion 52 of the suspension tower 5. In other words, by providing the slant portion 217a at the frame member 12 like the present embodiment, the rearward-moving energy at the vehicle frontal crush can be conveyed upward as shown by a solid-line arrow X and transmitted to the wheel apron 8 via the upper portion of the suspension tower 5.

Figure 19:
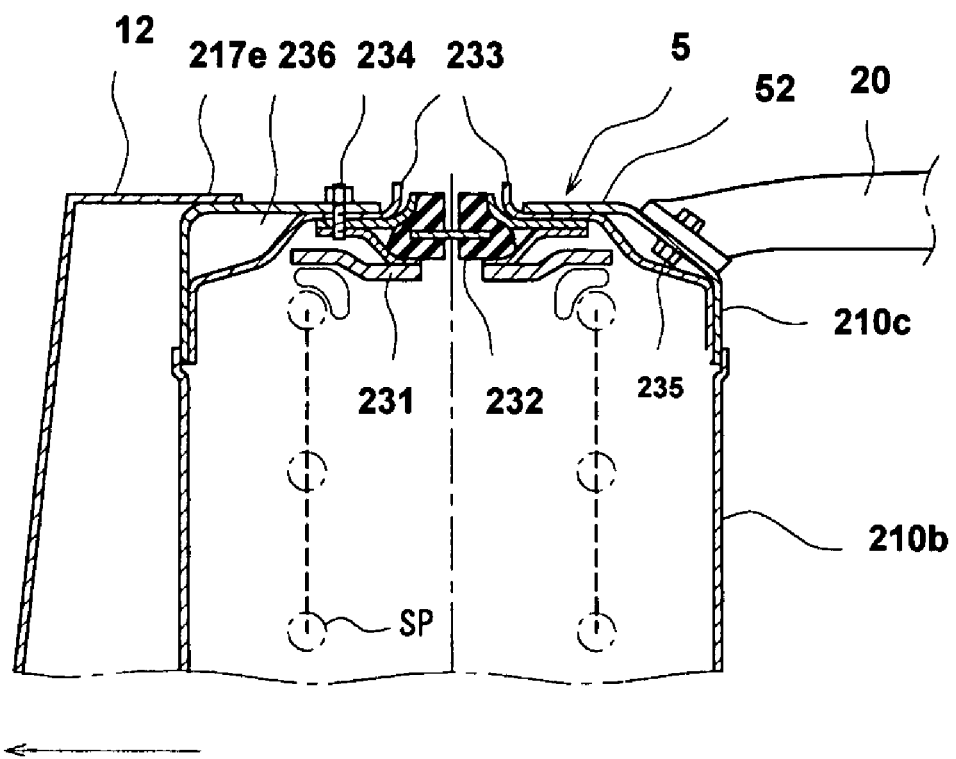
FIG. 19 is a sectional view showing a connection structure of an upper portion of a right-side suspension tower.
Figure 20:
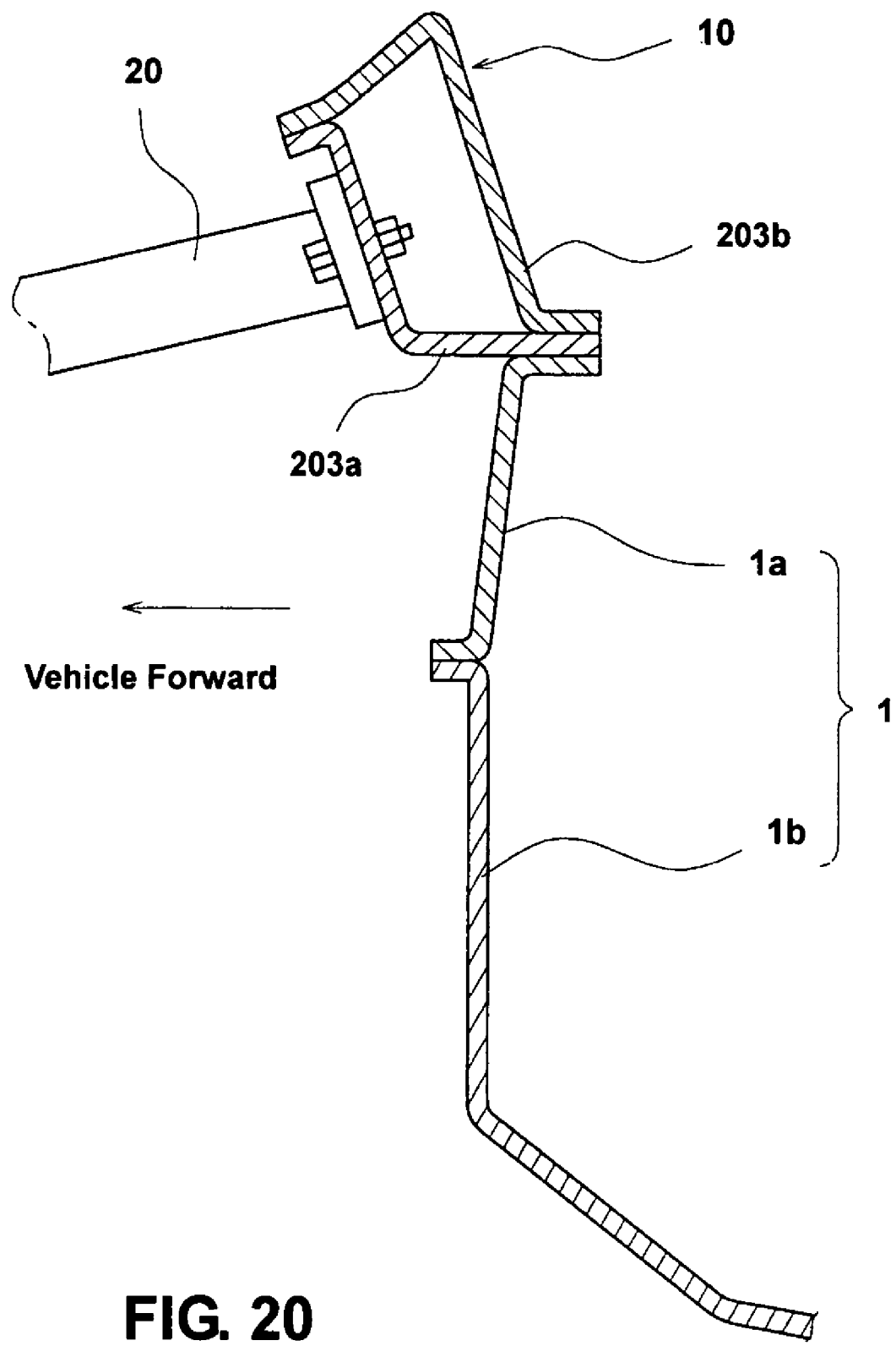
FIG. 20 is a sectional view showing a right-side structure of a cowl box and a dash panel.

The above-described rearward-moving energy that has been transmitted from the power plant P to the upper portion of the suspension tower 5 via the frame member 12 is directly transmitted to the cowl box 10 by the member 20 also shown in FIGS. 19 and 20.

FIG. 19 is a sectional view showing a connection structure of the upper portion of the suspension tower 5 of the present embodiment. Inside of a circular-cylindrical base portion 210b having an upper-closed portion of the suspension tower 5 is provided a receiving portion 231 to support a coil spring SP of a front suspension. At a central portion of this member is provided a through holes 233 for receiving a damper shaft, not illustrated, via a rubber bush 232 and the like. A disc-shaped reinforcing member 210c is fixed to an upper end portion of the base portion 210b via bolts 34 or the like. Thus, the upper portion 52 of the suspension tower 5 is formed. There is provided a ring-shaped space 236 enclosed by the base portion 210b and the reinforcing member 210c, thereby increasing the rigidity. The member 20 is fixed to a flat-shaped portion provided at part of the peripheral face of the reinforcing member 210c via bolts 235 or the like.

The cowl box 10 is, as shown in FIG. 20, comprised of a front panel 203a and a rear panel 203b, which are formed by bending plates and overlapped and connected to each other by welding or the like so as to form a rigid closed cross section therewith. The dash panel 1 comprises the upper panel 1a and the lower panel 1b, which are connected via bolts or the like.

A rear end portion of the member 20 is connected to the front panel 203a of the cowl box 10.

Since the suspension tower 5 and the cowl box 10 are interconnected via the longitudinally-extending member 20, the above-described rearward-moving energy is transmitted to the cowl box 10 as well, and the anti-crash function of the vehicle body can be properly improved.

Thus, the proper load transmission to the vehicle upper body portion can be obtained, and thereby the energy absorption of the front side frame 2 with the axial-direction compression can be properly attained.

In place of the above-described embodiment in which the rearward-moving energy of the power plant P is transmitted to the upper portion 52 of the suspension tower 5 via the members 18, 12, any other embodiments may be applied. For example, a single member (gusset member 317) shown in FIG. 21 may be used instead of the mount-attaching portion 18 and the frame member 12.

Figure 21:
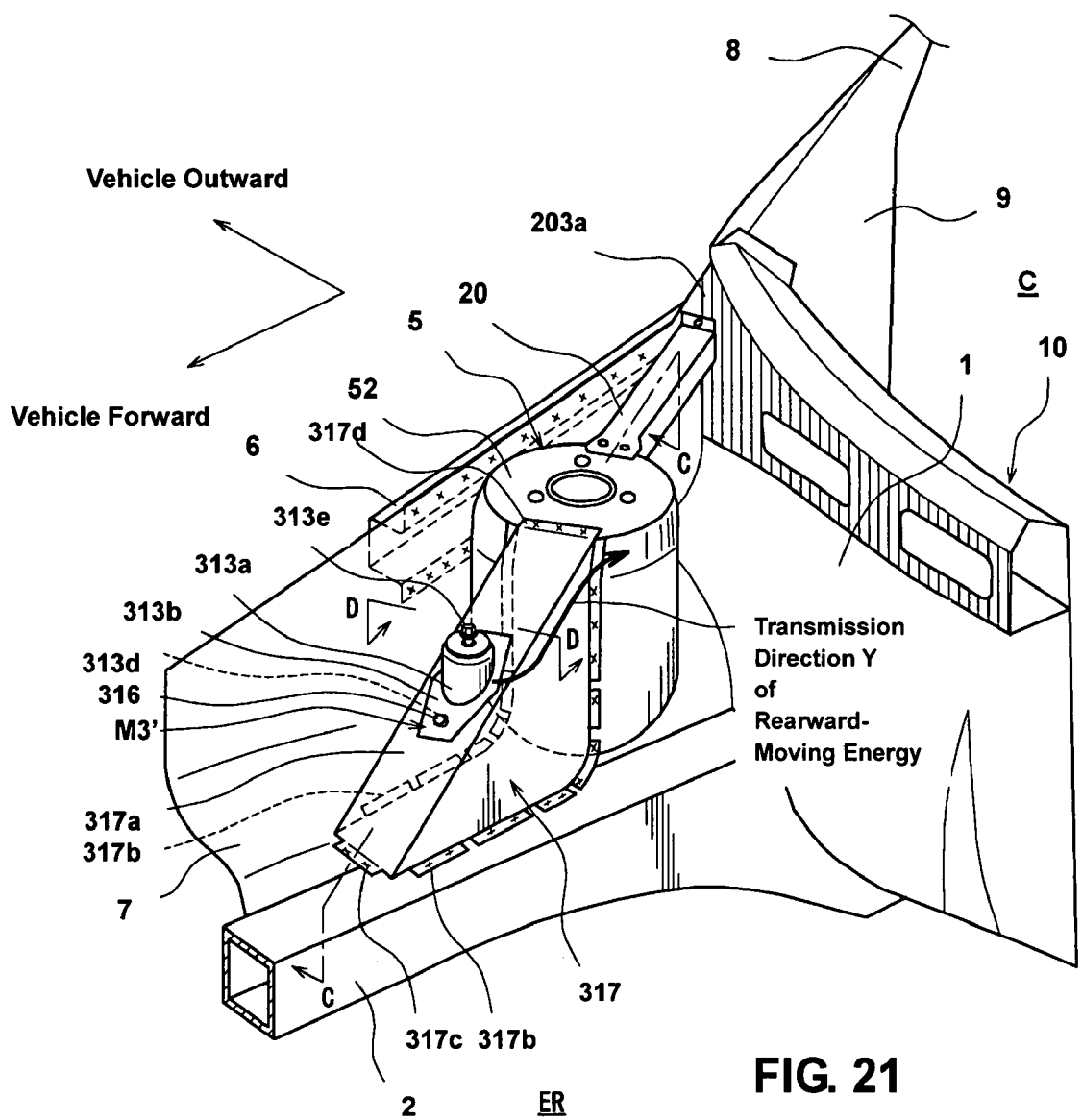
FIG. 21 is a perspective view showing a major portion of a right-side portion of the vehicle front body structure according to a second embodiment of the present invention.
Figure 22:
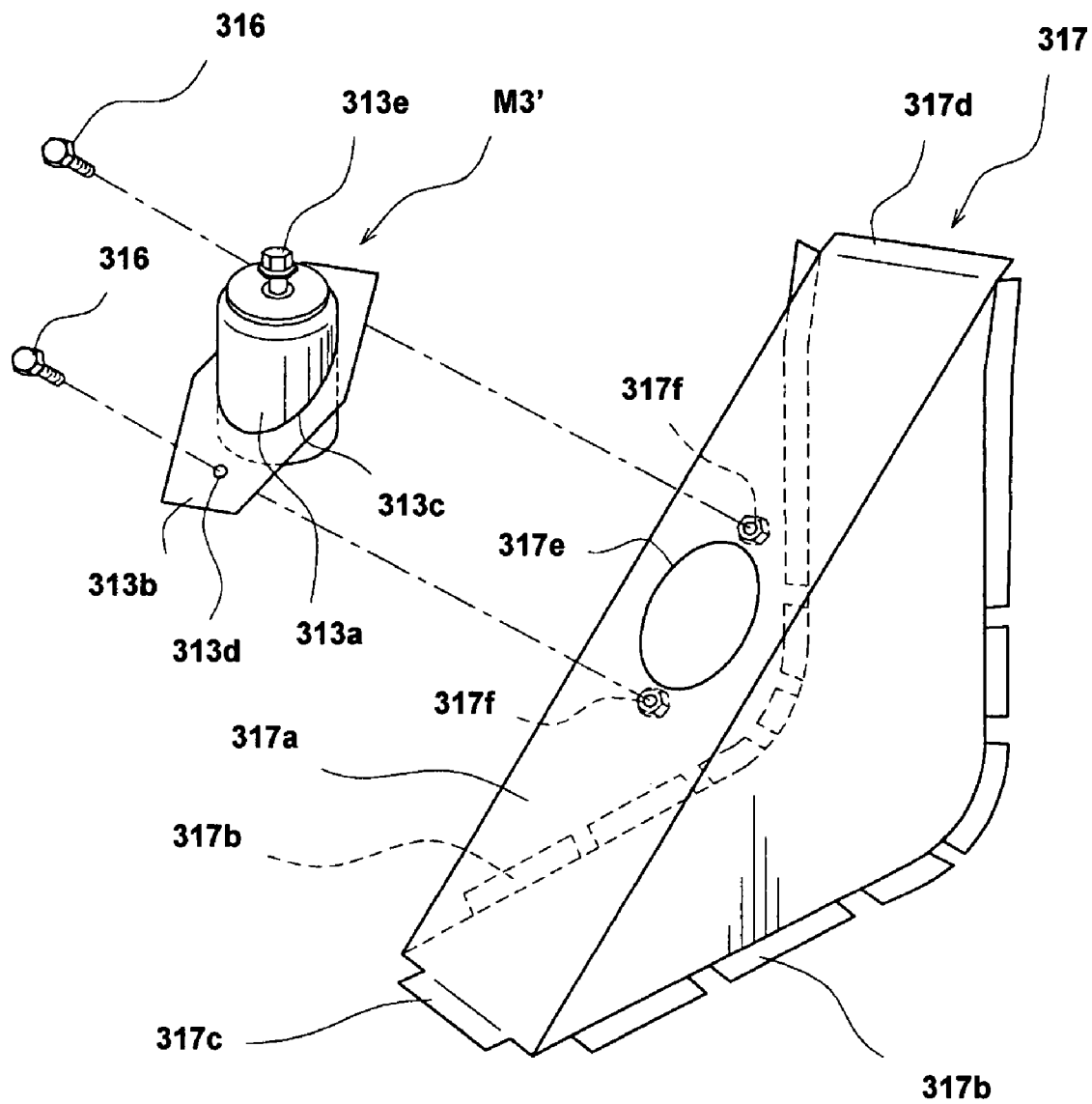
FIG. 22 is an exploded perspective view showing the major portion of the right-side portion of the vehicle front body structure according to the second embodiment of the present invention.
Figure 23A:
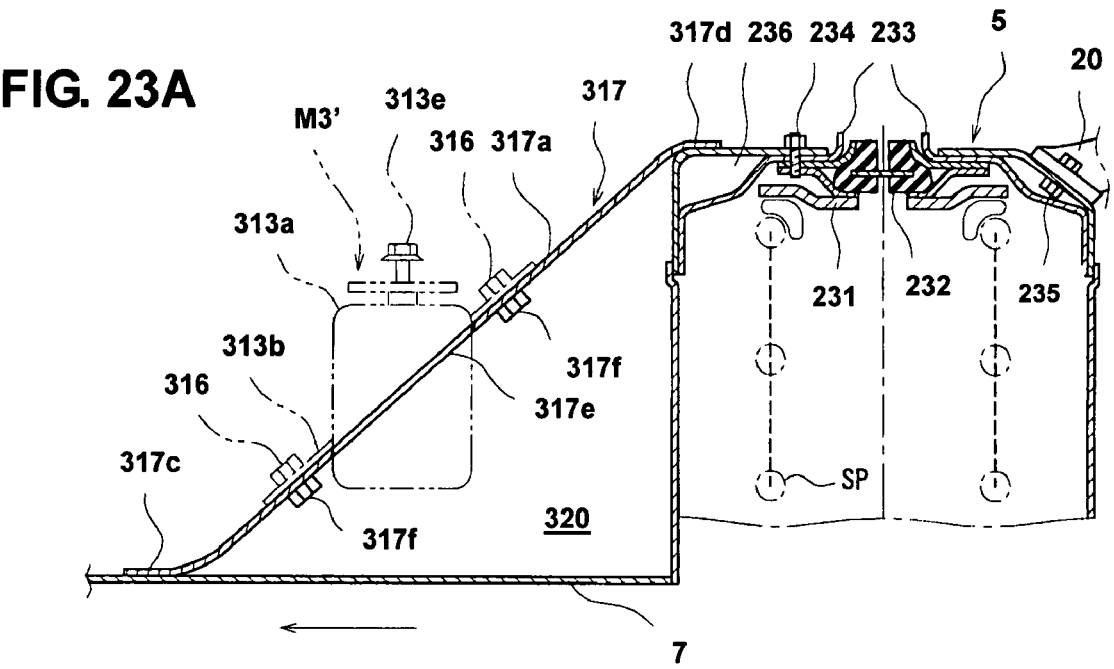
FIG. 23A is a sectional view taken along line C-C of FIG. 21.
Figure 23B:
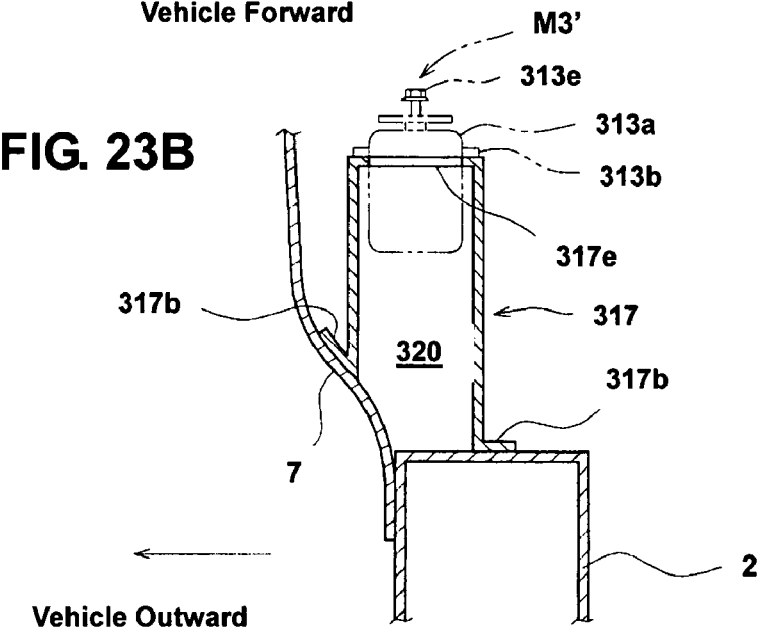
FIG. 23B is a sectional view taken along line D-D of FIG. 21.

FIG. 21 is a perspective view showing a major portion of a vehicle front body structure according to another embodiment. FIG. 22 is an exploded perspective view showing the major portion of the vehicle front body structure according to this embodiment. FIGS. 23A and 23B are sectional views taken along lines C-C and D-D of FIG. 21, respectively. Herein, the same parts as those of the previous embodiment are denoted by the same reference characters, and their descriptions are omitted here.

The gusset member 317 is formed in a box shape, as shown in FIG. 22, which comprises a slat face 317a that extends substantially straightly and obliquely and a side face that has substantially a triangular shape. A lower end portion of the gusset member 317 is connected to the wheel apron 7 and the upper face of the front side frame 2, and a rear end portion of the gusset member 317 is connected to the front face portion of the suspension tower 5.

The gusset member 317 has a plurality of flanges 317b, 317b, 317c at both sides and front side of its lower end portion, which are welded to the lower portion of the wheel apron 7 and the upper face of the front side frame 2, respectively.

The rear end portion of the gusset member 317 has plural flanges 317b, 317b at its both sides, which are welded to the front end portion of the suspension tower 5 behind the gusset member 317.

The gusset member 317 has also a flange 317d at an upper end portion of the slant face 317a, which is welded to the upper portion 52 of the suspension tower 5.

The gusset member 317 has a specified width in the vehicle width direction, and a No. 3 mount M3' is fixed to the slant face 317a. Specifically, an attaching bracket 313 of the mount M3' is fixed to the slant face 317a of the gusset member 317 via bolts 316.

The No. 3 mount M3' comprises, as shown in FIGS. 21 and 22, a circular cylindrical rubber member (not illustrated), an outer cylinder 313a that covers a periphery of the rubber member, a through hole 313c, an attaching bracket 313b that has bolt holes 313d, and a bolt 313e that projects from a center of the outer cylinder 313a. The outer cylinder 313a is inserted into the attaching bracket 313b, and they are formed as an unit member.

An opening 317e is formed at the slant face 317a of the gusset member 317, and the outer cylinder 313a of the mount M3' is inserted into this opening, so that the lower portion of the mount M3' is stored in a space enclosed by the gusset member 317, wheel apron 7, front side frame 2 and the front face portion of the suspension tower 5. The bolt 316 is inserted into the bolt holes 313d, 313d formed at the attaching bracket 313b of the mount M3' and holes of nuts 317f, 317f at the slant face 317a of the gusset member 317, and thereby the mount M3' is fixed to a specified position.

Thus, the gusset member 317, like the frame member 12 of the previous embodiment, can transmit the rearward-moving energy of the power plant P to the vehicle upper body portion via the upper portion of the suspension tower 5 and the apron member 6.

Also, the rearward-moving energy at the vehicle frontal crush can be conveyed upward as shown by a solid-line arrow Y in FIG. 21 and transmitted to the apron member 6 via the upper portion of the suspension tower 5.

Further, as shown in FIG. 23A, the slant face 317a forms the closed cross section 320 with the front face portion of the suspension tower 5 and the wheel apron 7, thereby improving the rigidity of the gusset member 317.

Also, the gusset member 317 is connected to the front side frame 2 at the lower end portion via the plural flanges 317b, 317b, 317c, so it functions as the engine mount attaching member for fixing the mount M3' to the specified location. Accordingly, the gusset member 317 can properly transmit the above-described rearward-moving energy to the front side frame 2, having its flanges 317b, 317b, 317c-burden the load, without increasing the number of parts improperly.

Since the slant face 317a extends upward from the front side frame 2 to the upper portion 52 of the suspension tower, the mount M3' can be located at an upper level and thereby the NVH function of the power plant P can be improved.

Also, since the lower end portion of the gusset member 317 is connected to the wheel apron 7 as well as the front side frame 2 as shown in FIG. 23B, the vibration energy of the engine E at the vehicle traveling in addition to the rearward-moving energy at the vehicle frontal crush can be transmitted to the wheel apron 7 as well as the front side frame 2.

Further, the opening 317e is of a circular shape, corresponding to the shape of the outer cylinder 313a, like the previous embodiment. Thus, the portion stored in the gusset member 317 is sealed up, so the rubber member in the outer cylinder 313a can be protected from the heated air from the engine room ER (see FIG. 14). The other operation and effects are the same as those of the previous embodiment.

The present invention should not be limited to the above-described embodiments, and any other modifications and improvements may be applied within the scope of a sprit of the present invention.

What is claimed is:

1. A vehicle front body structure, comprising:
a front side frame provided so as to project forward from a dash panel;
an apron member provided so as to project forward at a location that is outside the front side frame;
a suspension tower portion provided so as to protrude in an engine room for accommodating a front suspension therein, the suspension tower portion being disposed between the apron member and the front side frame;
an engine mount provided at the front side frame in front of the suspension tower portion so as to support a side portion of a power plant; and
a member provided so as to interconnect an upper portion of the suspension tower portion and a portion of the front side frame that is located in front of said engine mount, the member being disposed so as to extend substantially straightly in such a manner that the member overlaps with said engine mount in a plan view;
wherein said member is a bridge-shaped member, a rear portion of which is connected to said upper portion of the suspension tower portion and a front portion of which is connected to said portion of the front side frame that is located in front of the engine mount, the bridge-shaped member being disposed to stride over said engine mount.

2. The vehicle front body structure of claim 1, wherein said member comprises a first base portion that is connected to the portion of the front side frame that is located in front of the engine mount and a second base portion that is connected to a portion of the front side frame that is located in back of the engine mount.

3. The vehicle front body structure of claim 1, wherein a cowl portion is provided behind said suspension tower portion so as to extend in a vehicle width direction, and there is provided a connecting member that interconnects the upper portion of the suspension tower portion and the cowl portion and extends substantially in a longitudinal direction of a vehicle.

4. The vehicle front body structure of claim 1, wherein said member comprises a pair of members that are provided at left and rights sides of a vehicle respectively, the pair of members are disposed obliquely in such a manner that a distance between the members gradually becomes wider toward a rear of the vehicle in a plan view, and respective upper portions of left-and-right side suspension towers are interconnected by a suspension-tower bar.

5. A vehicle front body structure, comprising:
a pair of front side frames provided at both sides of a vehicle so as to project forward from a dash panel;
a pair of apron members provided at both sides of the vehicle so as to project forward at a location that is outside each of the front side frames;
a pair of suspension tower portions provided at both sides of the vehicle so as to protrude in an engine room for accommodating a pair of front suspensions therein, the suspension tower portions being disposed between the apron members and the front side frames respectively;
a pair of engine mounts respectively provided at the front side frames in front of the suspension tower portions so as to support both side portions of a power plant;
a first member provided so as to interconnect an upper portion of one of said suspension tower portions and a portion of one of said front side frames that is located in front of one of said engine mounts,
wherein the first member is a bridge-shaped member, a rear portion of which is connected to the upper portion of the one of the suspension tower portions and a front portion of which is connected to the portion of the one of the front side frames that is located in front of the one of the engine mounts, the first bridge-shaped member being disposed to stride over the one of the engine mounts; and
a second member provided so as to interconnect an upper portion of the other of said suspension tower portions and a portion of the other of said front side frames that is located in front of the other of said engine mounts,
wherein the second member comprises a frame member that is connected to a front face portion of the other of the suspension tower portions and an engine mount attaching portion that is connected to a front portion of the frame member so as to support the other of the engine mounts, and the frame member forms a closed cross section with the front face portion of the other of the suspension tower portions, the closed cross section extending substantially vertically.

* * * * *